(12) United States Patent
Hamatani et al.

(10) Patent No.: US 8,763,461 B2
(45) Date of Patent: Jul. 1, 2014

(54) ACCELERATION SENSOR DEVICE AND SENSOR NETWORK SYSTEM

(75) Inventors: Yoshiki Hamatani, Tokyo (JP); Yoshitomi Morizawa, Tokyo (JP); Tetsuya Yanoshita, Tokyo (JP); Koji Ikawa, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 901 days.

(21) Appl. No.: 12/894,097

(22) Filed: Sep. 29, 2010

(65) Prior Publication Data

US 2011/0016973 A1 Jan. 27, 2011

Related U.S. Application Data

(63) Continuation of application No. PCT/JP2009/056175, filed on Mar. 26, 2009.

(30) Foreign Application Priority Data

Mar. 31, 2008 (JP) ................................. 2008-093278

(51) Int. Cl.
*G01P 15/10* (2006.01)

(52) U.S. Cl.
USPC ..................................... 73/514.29; 73/514.35

(58) Field of Classification Search
USPC ............. 73/509, 510, 514.16, 514.29, 514.35
See application file for complete search history.

(56) References Cited

U.S. PATENT DOCUMENTS

| | | | |
|---|---|---|---|
| 3,702,493 A | 11/1972 | Murphy | |
| 3,946,422 A | 3/1976 | Yagi et al. | |
| 3,967,027 A | 6/1976 | Igarashi | |
| 4,250,415 A | 2/1981 | Lewiner et al. | |
| 4,291,245 A | 9/1981 | Nowlin et al. | |
| 4,441,038 A | 4/1984 | Tanaka et al. | |
| 4,442,324 A | 4/1984 | Blanchard et al. | |

(Continued)

FOREIGN PATENT DOCUMENTS

| | | |
|---|---|---|
| CN | 1651876 A1 | 8/2005 |
| DE | 3643203 A1 | 12/1986 |

(Continued)

OTHER PUBLICATIONS

Kimikiho et al. (English Translation of Japanese Patent Application Publication JP 2006-329800 A).*

(Continued)

*Primary Examiner* — Peter Macchiarolo
*Assistant Examiner* — Samir M Shah
(74) *Attorney, Agent, or Firm* — Foley & Lardner LLP

(57) ABSTRACT

To provide an acceleration sensor and a sensor network system having a construction in which the consumption of power to be consumed can be reduced and the sensor itself can be miniaturized without using any piezoelectric sensor or piezoelectric bimorph.

An acceleration sensor device provided with an acceleration sensor which is an electrostatic induction conversion device for conversion between electric energy and kinetic energy, which comprises a conductor and an electret moving relatively to the conductor, said acceleration sensor device having: an acceleration detection unit to detect a signal corresponding to acceleration, from an AC voltage output by the acceleration sensor; a rectification unit to rectify the AC voltage; and a power supply circuit having a battery to power circuits in the device to work, to charge the battery with the rectified voltage as electric energy.

14 Claims, 12 Drawing Sheets

(56) References Cited

U.S. PATENT DOCUMENTS

| | | | |
|---|---|---|---|
| 4,443,711 A | | 4/1984 | Tanaka et al. |
| 4,513,049 A | | 4/1985 | Yamasaki et al. |
| 4,642,504 A | * | 2/1987 | Jacobsen ............... 310/308 |
| 5,161,233 A | | 11/1992 | Matsuo et al. |
| 5,256,176 A | | 10/1993 | Matsuura et al. |
| 5,267,076 A | | 11/1993 | Broussoux et al. |
| 5,284,693 A | | 2/1994 | Spain et al. |
| 5,439,768 A | * | 8/1995 | Matsuo et al. ............ 430/56 |
| 5,558,809 A | | 9/1996 | Groh et al. |
| 5,610,455 A | | 3/1997 | Allen et al. |
| 5,638,103 A | | 6/1997 | Obata et al. |
| 5,731,116 A | | 3/1998 | Matsuo et al. |
| 5,759,205 A | | 6/1998 | Valentini |
| 5,787,327 A | | 7/1998 | Matsushita et al. |
| 5,981,123 A | | 11/1999 | Matsuo et al. |
| 6,489,033 B1 | | 12/2002 | Hatke et al. |
| 6,493,013 B2 | | 12/2002 | Obata et al. |
| 6,573,205 B1 | | 6/2003 | Myers et al. |
| 6,806,593 B2 | | 10/2004 | Tai et al. |
| 6,833,687 B2 | | 12/2004 | Landolt |
| 6,870,939 B2 | | 3/2005 | Chiang et al. |
| 6,893,990 B2 | | 5/2005 | Myers et al. |
| 7,449,811 B2 | * | 11/2008 | Suzuki et al. ............ 310/309 |
| 7,732,974 B1 | * | 6/2010 | Boland et al. ............ 310/309 |
| 7,768,425 B2 | * | 8/2010 | Evans et al. ............ 340/870.17 |
| 7,804,205 B2 | * | 9/2010 | Murayama et al. ....... 307/400 |
| 7,851,967 B2 | * | 12/2010 | Matsubara et al. ....... 310/309 |
| 7,879,446 B2 | | 2/2011 | Liu et al. |
| 7,956,497 B2 | * | 6/2011 | Murayama et al. ....... 307/400 |
| 8,089,194 B2 | * | 1/2012 | Naruse et al. ............ 310/309 |
| 8,102,097 B2 | * | 1/2012 | Naruse et al. ............ 310/309 |
| 8,129,869 B2 | * | 3/2012 | Kashiwagi ................ 307/400 |
| 8,164,231 B2 | * | 4/2012 | Mabuchi .................. 310/309 |
| 8,212,433 B2 | * | 7/2012 | Kashiwagi et al. ....... 307/400 |
| 8,277,927 B2 | * | 10/2012 | Kashiwagi et al. ....... 428/216 |
| 8,384,267 B2 | * | 2/2013 | Naruse et al. ............ 310/309 |
| 8,466,600 B2 | * | 6/2013 | Naruse et al. ............ 310/309 |
| 2002/0080684 A1 | | 6/2002 | Donskoy et al. |
| 2004/0158294 A1 | | 8/2004 | Thompson |
| 2005/0009944 A1 | | 1/2005 | Apostolo et al. |
| 2005/0107555 A1 | | 5/2005 | Chiang et al. |
| 2006/0113862 A1 | * | 6/2006 | Suzuki et al. ............ 310/309 |
| 2007/0096974 A1 | * | 5/2007 | Gleacher et al. ......... 342/70 |
| 2008/0048521 A1 | | 2/2008 | Mabuchi et al. |
| 2008/0111444 A1 | | 5/2008 | Mabuchi |
| 2008/0122313 A1 | | 5/2008 | Mabuchi et al. |
| 2009/0051242 A1 | | 2/2009 | Suzuki et al. |
| 2009/0058634 A1 | * | 3/2009 | Maltseff et al. .......... 340/539.11 |
| 2009/0245547 A1 | | 10/2009 | Lee et al. |
| 2010/0127595 A1 | | 5/2010 | Suzuki et al. |
| 2011/0012438 A1 | | 1/2011 | Kashiwagi et al. |

FOREIGN PATENT DOCUMENTS

| | | |
|---|---|---|
| EP | 0 369 032 A1 | 5/1990 |
| EP | 0 460 523 A1 | 12/1991 |
| EP | 0 950 672 A1 | 10/1999 |
| EP | 0 969 023 A2 | 1/2000 |
| EP | 2 266 792 A1 | 12/2010 |
| GB | 2 079 056 A | 1/1982 |
| JP | 3-156375 | 7/1991 |
| JP | 04-255716 A | 9/1992 |
| JP | 04-282421 A | 10/1992 |
| JP | 8-15302 | 1/1996 |
| JP | 08-041260 A | 2/1996 |
| JP | 08-155230 A | 6/1996 |
| JP | 2001-158384 A | 6/2001 |
| JP | 2002-505034 | 2/2002 |
| JP | 2003-013359 A | 1/2003 |
| JP | 2004-059763 A | 2/2004 |
| JP | 2004-128361 A | 4/2004 |
| JP | 2004-301571 A | 10/2004 |
| JP | 2005-056191 A | 3/2005 |
| JP | 2005-337736 A | 12/2005 |
| JP | 2006-180450 | 7/2006 |
| JP | 2006-253847 | 9/2006 |
| JP | 2006-329800 | 12/2006 |
| JP | 2007-251529 A | 9/2007 |
| JP | 2007-292743 | 11/2007 |
| JP | 2007-312551 A | 11/2007 |
| JP | 2007-333618 | 12/2007 |
| JP | 2008-010176 | 1/2008 |
| JP | 2008-016919 A | 1/2008 |
| JP | 2008-28499 | 2/2008 |
| JP | 2008-167231 A | 7/2008 |
| JP | 2008-266563 A | 11/2008 |
| JP | 2009-17769 | 1/2009 |
| WO | WO-98/56836 A1 | 12/1998 |
| WO | WO 2007/044921 A1 | 4/2007 |
| WO | WO-2008/114489 A1 | 9/2008 |
| WO | WO-2008/133088 A1 | 11/2008 |
| WO | WO-2009/104699 A1 | 8/2009 |

OTHER PUBLICATIONS

Takeshi et al. (English Translation of Japanese Patent Application Publication JP 2007-292743).*
Masashi et al. (English Translation of Japanese Patent Application Publication JP 2006-253847).*
Supplementary European Search Report European Application No. 09726663.9 dated Oct. 16, 2012.
Notification of Transmittal of Translation of the International Preliminary Report on Patentability (IPRP) in PCT/JP2009/056175 dated Dec. 23, 2010.
Office Action in U.S. Appl. No. 12/805,234 dated Feb. 14, 2012.
Office Action in U.S. Appl. No. 12/904,856 dated Mar. 29, 2012.
U.S. Appl. No. 12/890,441, filed Sep. 24, 2010, Kashiwagi et al.
U.S. Appl. No. 13/049,833, filed Mar. 16, 2011, Kashiwagi.
U.S. Appl. No. 12/805,234, filed Jul. 20, 2010, Kashiwagi.
U.S. Appl. No. 12/904,856, filed Oct. 14, 2010, Kashiwagi et al.
International Search Report in PCT/JP2009/055979.
International Search Report in PCT/JP2009/066181.
International Search Report in PCT/JP2009/057656.
International Search Report in PCT/JP2009/052932.
International Search Report received in corresponding International application No. PCT/JP2009/056175.
Supplementary European Search Report dated Aug. 2, 2011 in EP 09711771.7.
Supplementary European Search Report dated Jul. 27, 2011, in EP 09724065.9.
Supplementary European Search Report dated Jul. 28, 2011, in EP 09732621.9.
European Patent Office Communication in Application No. 09 726 663.9 dated Nov. 21, 2013, 7 pages.

* cited by examiner

ACCELERATION SENSOR DEVICE AND SENSOR NETWORK SYSTEM

TECHNICAL FIELD

The present invention relates to an acceleration sensor device using an electrostatic induction acceleration sensor provided with an electret which moves relatively to a conductor, said acceleration sensor being an electrostatic induction conversion device to carry out conversion between kinetic energy and electric energy, and a sensor network system utilizing the acceleration sensor device.

BACKGROUND ART

Heretofore, there has been an acceleration sensor to detect acceleration, by which the acceleration is measured as follows: a piezoelectric element loaded with a weight is mounted at the bottom of a metal housing; an external acceleration is exerted to the weight to generate an inertial force; a stress is applied to the piezoelectric element by the inertial force of the weight, and a voltage is generated by the piezoelectric element corresponding to the applied stress; and the voltage is converted to an acceleration (for example, Patent Document 1).

Further, a multiaxial acceleration sensor has been also manufactured, in which piezoelectric elements each loaded with a weight as described above are arranged so that their respective detecting acceleration directions are perpendicular to one another, so that accelerations can be detected in all of three dimensional directions x, y and z (for example, Patent Document 2).

Such an acceleration sensor uses a so-called piezoelectric bimorph, which is made of rectangular piezoelectric ceramic plates, each of which is metalized by having metal films with conductivity attached on both sides and which are bonded together directly or with a metal plate interposed therebetween so that their respective flat surfaces face each other.

In the acceleration sensor, one of the ends in the length direction of the piezoelectric bimorph is fixed to e.g. a frame, and the other end is permitted to be a free end.

In such a state, when an acceleration is exerted to the piezoelectric bimorph in the thickness direction (direction perpendicular to the flat surface being a main surface of the piezoelectric ceramic plate), the piezoelectric bimorph is deflected, and a voltage corresponding to the amount of the deflection is generated at the electrodes on both sides of the piezoelectric bimorph. Then, depending on the magnitude of the voltage, the acceleration exerted to the piezoelectric bimorph is detected.

A construction in which such piezoelectric bimorphs are fixed so that the directions of the main surfaces of the bimorphs are perpendicular to each other (for example, Patent Document 3) or an acceleration sensor in which a single sensor element, such as a piezoelectric bimorph, is mounted on a circuit board so that it turns to any optional direction, is manufactured. There is also a construction in which a plurality of such acceleration sensors are used in combination to enable detection of accelerations in various directions (for example, Patent Document 4).

Further, there is also a construction in which, using an inertial mass plate which changes its position relative to a counter electrode, an acceleration exerted to the inertial mass plate is detected based on a change in position of the inertial mass plate i.e. based on a change in capacitance between the counter electrode and the inertial mass plate (for example, Patent Document 5).

On the other hand, in recent years, attention has been paid to a so-called wireless sensor network, in which sensors distributed at multiple sites are interconnected by the wireless communication technology.

In the wireless network system, sensor nodes which have a sensor circuit to convert a physical amount detected by each sensor into an electric signal and a wireless circuit having data storage and diagnostic functions as well as transmit-receive functions, are networked wirelessly.

With topologies, network control function and security function provided by this wireless network, an extremely large scale and wide area sensing system can be easily constructed.

And, such a wireless network system may be utilized for monitoring of equipments in a large chemical plant, maintenance of structures such as roads, bridges and dams, prediction of landslides, and so on.

A wireless sensor network takes advantage of characteristics of wireless, such as convenience, extendibility, and easy installation at a site where cabling is difficult.

Accordingly, it is not possible to supply power through lines to the respective sensor nodes. Therefore, generally, each node needs to have a built-in battery as a power source to actuate the functions of e.g. internal circuits.

Also, in many cases, the sensor nodes are installed at sites where it is difficult to replace batteries, considering the usage of the sensor nodes. Accordingly, prolongation of battery life remains to be a problem to be solved.

Under the circumstances, as one of the means to reduce power consumption, it has been proposed to control the communication timing by e.g. synchronization of wireless communications (for example, Chapter 4 of Non-patent Document 1).

As another means to reduce power consumption, a method of carrying out a flexible intermittent operating control over sensing by sensor circuits or timing of wireless communications has been proposed (for example, Patent Document 6).

Patent Document 1: JP A 64-41865
Patent Document 2: JP U 1-112468
Patent Document 3: JP A 3-156375
Patent Document 4: JP A 08-15302
Patent Document 5: JP A 2007-333618
Patent Document 6: JP A 2008-28499
Non-patent Document 1: Chapter 3 "Vision for the future of the ubiquitous sensor network" in "The final report for a realization of the ubiquitous sensor network", Ministry of Internal Affairs and Communications, September 2004 (http://www.soumu.go.jp/s-news/2004/040806_4_b2.html, accessed on Mar. 6, 2008)

DISCLOSURE OF THE INVENTION

Object to be Accomplished by the Invention

However, in order to detect abnormal vibration promptly without fail, it is necessary to maintain the sensor for detecting acceleration exerted by the abnormal vibration to be active constantly. For this purpose, power of a built-in battery is used, corresponding to the power constantly consumed by internal circuits of each sensor node in the above-described wireless sensor network. This power consumption suppresses the reduction of the power consumption to prolong the life of built-in batteries in the sensor nodes.

And, the above-described acceleration sensor itself has a disadvantage of not being miniaturizable because a piezoelectric sensor or a sensor using a piezoelectric bimorph requires a weight to detect acceleration as an inertial force.

Further, the above-described sensor using an inertial mass plate requires a voltage applied in advance between the inertial mass plate and the counter electrode, which leads to complexity of the structure of the sensor.

The present invention has been made under such circumstances, and an object of the present invention is to provide an acceleration sensor and a sensor network system having a construction in which the consumption of power to be consumed can be reduced and the sensor itself can be miniaturized without using any piezoelectric sensor or piezoelectric bimorph.

Means to Accomplish the Object

The acceleration sensor device of the present invention is provided with an acceleration sensor (for example, acceleration sensor 1 in Embodiments) which is an electrostatic induction conversion device for conversion between electric energy and kinetic energy, which comprises a conductor (for example, electrodes 12 and 13 in Embodiments) and an electret (for example, electret 11 in Embodiments) moving relatively to the conductor, said acceleration sensor device having: an acceleration detection unit (for example, comparator 5 and detection unit 7 in Embodiments) to detect a signal corresponding to acceleration, from an AC voltage output by the acceleration sensor; a rectification unit (for example, rectification unit 2 in Embodiments) to rectify the AC voltage; and a power supply circuit having a battery (for example power supply unit 3 in Embodiments) to drive circuits in the device and adapted to charge the battery with the rectified voltage as electric energy.

In the acceleration sensor device of the present invention, the acceleration detection unit has an abnormal vibration-detecting circuit (for example, comparator 5 in Embodiments) which compares the rectified voltage with a preset threshold voltage to output an abnormal signal notifying an abnormality when the rectified voltage exceeds the threshold voltage.

The acceleration sensor device of the present invention further has a recording circuit which is activated by the abnormal signal output by the abnormal vibration-detecting circuit as triggered by an abnormal vibration detected by the acceleration detection unit, to start recording a signal corresponding to acceleration; and which terminates the recording at a preset timing.

The acceleration sensor device of the present invention further has a recording circuit which is activated by the abnormal signal output by the abnormal vibration-detecting circuit as triggered by an abnormal vibration detected by the acceleration detection unit, to start recording a signal corresponding to acceleration; and which stops recording the signal corresponding to acceleration, by an abnormal vibration-end signal output by the abnormal vibration-detecting circuit which detects the end of the abnormal vibration.

The acceleration sensor device of the present invention further has a determination unit to determine whether the abnormal vibration is a vibration which should be recorded, by comparing an objective vibration pattern consisting of the frequency of the signal corresponding to acceleration and the spectrum intensity corresponding to the frequency, with a preset reference vibration pattern consisting of a frequency and its corresponding spectrum intensity to determine by the comparative result whether the signal corresponding to acceleration should be recorded.

In the acceleration sensor device of the present invention, the determination unit holds a setting range with an upper limit and a lower limit of a spectrum intensity for each frequency, which is determined by each frequency of the reference vibration pattern and the spectrum intensity of the frequency, and it determines whether the signal corresponding to acceleration should be recorded, by the comparative result of whether the spectrum intensity of each frequency of the objective vibration pattern is within the setting range.

In the acceleration sensor device of the present invention, the determination unit carries out Fourier transform to obtain a frequency of the voltage of the signal corresponding to acceleration and a spectrum intensity corresponding to the frequency at every predetermined time interval.

In the acceleration sensor device of the present invention, the acceleration detection unit internally memorizes the voltage of the signal corresponding to acceleration from the beginning to the end of an abnormal signal, and, at every predetermined time interval, the determination unit sequentially reads out the voltage of the signal corresponding to acceleration for each time range corresponding to the predetermined time interval and carries out Fourier transform to generate an objective vibration pattern.

In the acceleration sensor device of the present invention, the predetermined setting range in the determination unit is generated from a reference vibration pattern attributed to a disturbance vibration in an environment, which is obtained in a predetermined period of time.

In the acceleration sensor device of the present invention, the abnormal vibration-detection circuit detects an end of an abnormal vibration and outputs an abnormal vibration-end signal, and the recording circuit stops recording the signal corresponding to acceleration, by the abnormal vibration-end signal.

In the acceleration sensor device of the present invention, the material for the electret in the acceleration sensor comprises an organic material.

In the acceleration sensor device of the present invention, the material for the electret in the acceleration sensor contains at least one cycloolefin polymer.

In the acceleration sensor device of the present invention, the material for the electret in the acceleration sensor comprises a fluoropolymer.

In the acceleration sensor device of the present invention, the material for the electret in the acceleration sensor comprises a polymer having a fluoroalicyclic structure in its main chain.

In the acceleration sensor device of the present invention, the recording circuit further has a numerical value-detecting acceleration sensor to detect a numerical value of the acceleration.

In the acceleration sensor device of the present invention, the numerical value-detecting acceleration sensor is more precise than the acceleration sensor.

The wireless sensor network of the present invention has plural sensor nodes and a data collection server which collects data detected by the sensor nodes, wherein at least one sensor node is any one of the acceleration sensor devices as defined above having a built-in wireless communication function.

The wide area-abnormal vibration recording system of the present invention uses the wireless sensor network as defined above, wherein any one of the acceleration sensor devices as defined above is used as the sensor nodes, and records abnormal vibrations at plural points.

Effects of the Invention

As described above, according to the present invention, it is possible to realize detection of accelerations in various directions by a simple structure, by using an acceleration sensor provided with an electret moving relatively to a conductor, which is an electrostatic induction conversion device for conversion between electric energy and kinetic energy.

Also, according to the present invention, exerted acceleration is detected as an electric signal corresponding to the acceleration output by the acceleration sensor; and electric power is generated by the electric signal, the battery is charged with the obtained electric energy, and the charged power is utilized as the power for driving circuits thereof, whereby the battery life can be prolonged as compared to conventional ones.

Further, according to the present invention, the recording circuit is activated only when abnormal vibration is detected by the acceleration sensor having an electret, i.e., only when it is required to detect an acceleration value, whereby intermittent operating control of control unit (CPU etc.) to control inner circuits and the recording circuit for detecting a numerical value of acceleration, which consumes the battery power, can be carried out without adding a circuit block which may affect the battery life, and the battery life can be prolonged as compared to conventional batteries while the sensing state is constantly maintained.

MEANINGS OF SYMBOLS

Figure 1:
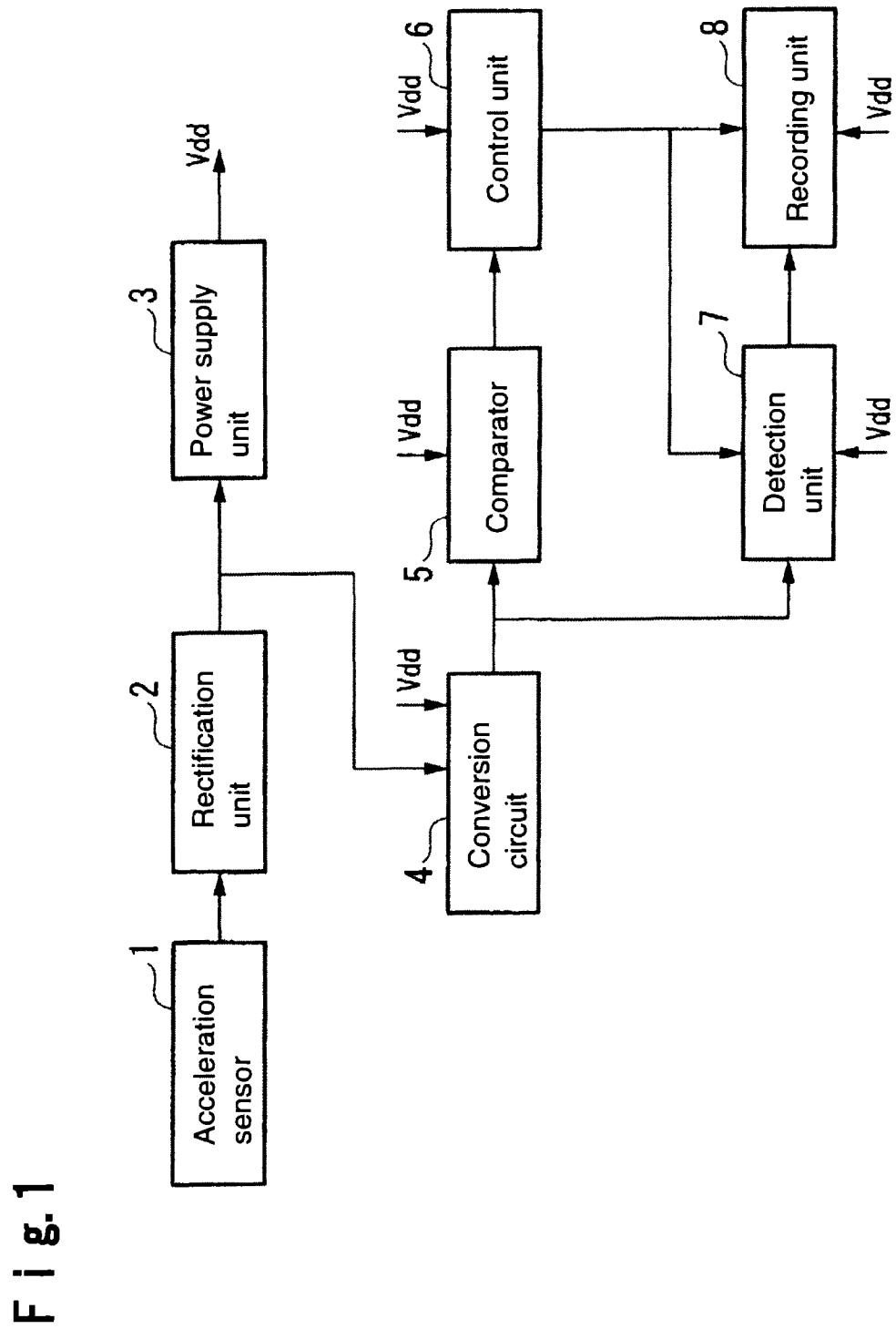
FIG. 1 is a block diagram showing a structural example of an acceleration sensor device according to the first embodiment of the present invention.

1: acceleration sensor
2: rectification unit
3: power supply unit
4: conversion circuit
5: comparator
6: control unit
7: detection unit
8: recording unit
9: limit circuit
11: electret
12, 13: electrode plate
14, R1, R2, 901, 902, 903: resistance
909, 910, 911, 915, 916: resistance
906, 912, OP1: operational amplifier
904, 905, 907, 908, D1, D2, D3, D4: diode
913, 914: zener diode
917: capacitor

BEST MODE FOR CARRYING OUT THE INVENTION

<First Embodiment>

Now, an acceleration sensor device according to the first embodiment of the present invention will be described with reference to drawings. FIG. 1 is a block diagram showing a structural example of an acceleration sensor device according to the first embodiment.

In this figure, the acceleration sensor device according to this embodiment has acceleration sensor 1, rectification unit 2, power supply unit 3, convertor circuit 4, comparator 5, control unit 6, detection unit 7 and recording unit 8. Here, power supply unit 3 supplies operating voltage Vdd, to each unit.

Figure 2:
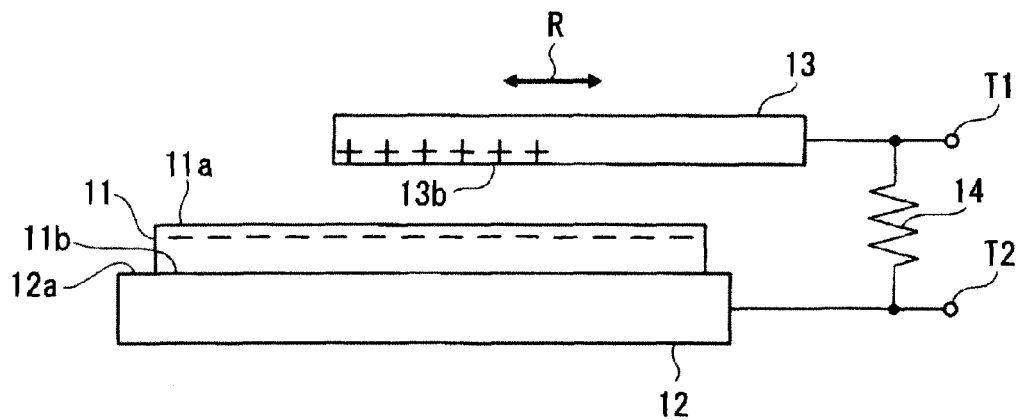
FIG. 2 is a conceptual side view of acceleration sensor 1, illustrating a structure of acceleration sensor 1 in the first and second embodiments of the present invention.

FIG. 2 is a conceptual side view of acceleration sensor 1. The acceleration sensor 1 is an electrostatic induction conversion device which converts kinetic energy into electric energy, and electrode plates 12 and 13 of a conductive material are arranged with a space so that the flat surfaces of both electrode plates are parallel and face each other. And, a plate-shaped electret 11 is arranged in the space between the electrode plates so that it is parallel to the flat surfaces of electrode plates 12 and 13.

Here, either electrode plate 12 or 13 is fixed against a parallel motion mechanism, which is not shown in the figure, so that at least one electrode plate facing electret 11, i.e. either electrode plate 12 or electrode plate 13, can move relatively to electret 11 in the direction of arrow R (a direction in which the flat surface portion of the electrode plate moves parallel to the flat surface of electret 11). In such a case, electret 11 may be fixed on either one of the electrode plates.

In FIG. 2, for example, electret 11 has lower flat surface 11*b* fixed on upper flat surface 12*a* of electrode plate 12, and it is arranged so that its upper flat surface 11a faces lower flat surface 13b of electrode plate 13. Here, electrode plates 12 and 13 are connected via resistance 14. This resistance 14 means a load resistance connected to steps after acceleration sensor 1.

And, electret 11 is formed by introducing electric charge (negative charge in FIG. 2) into an insulating material. To introduce electric charge into electret 11, known methods may be employed such as liquid contact, corona discharge, electron beam and back-lighted thyratron.

In the construction as described above, it is possible to have electrode plate 13 moving in the direction of arrow R relatively to electret 11. Here, electrode plate 13 and electret 11 are movably constructed so that their surfaces facing each other can move parallel to each other. And, electric charge (negative charge in FIG. 2) is introduced into electret 11 by this relative motion, whereby the opposite electric charge (positive charge in FIG. 2), which is opposite to the electric charge introduced into electret 11, is electrically induced to electrode plate 13. As a result, a current proportional to the distance of the relative movement of electrode plate 13 to electret 11 flows through resistance 14. When the current flows through resistance 14, a voltage is generated between the terminals of resistance 14 corresponding to the resistance value of resistance 14 and the current value of the flowing current. In this way, the acceleration sensor in this embodiment works as a sensor of an electrostatic induction conversion device which converts kinetic energy of the parallel movement into electric energy of a voltage value corresponding to the acceleration and outputs this voltage value as a detection result.

Figure 3:
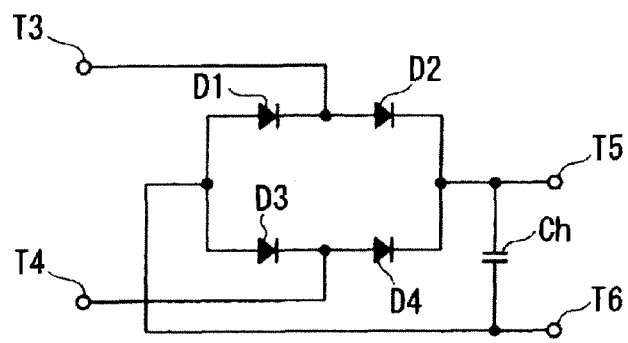
FIG. 3 is a conceptual diagram showing an example of a circuit configuration of rectification unit 2 in FIG. 1.

Next, rectification unit 2 in FIG. 1 is, as shown in FIG. 3, composed of a diode bridge composed of diodes D1 to D4 and a smoothing capacitor Ch allocated between output terminals T5 and T6 of this diode bridge.

Input terminals T3 and T4 of rectification unit 2 are connected to output terminals T1 and T2 of acceleration sensor 1, respectively.

Rectification unit 2 thereby rectifies and smoothes an AC voltage corresponding to the distance of relative movement of electrode plate 13 to electret 11 i.e. corresponding to the acceleration exerted to electrode 13, which is input from acceleration sensor 1, and outputs it as a DC voltage to power supply unit 3.

In FIG. 1 again, power supply unit 3 has an internal battery (secondary battery), and it supplies conversion circuit 4, comparator 5, control unit 6, detection unit 7 and recording unit 8 with driving power which each circuit consumes. And, power supply unit 3 has a charging circuit, and it converts a DC voltage output by rectification unit 2 to a voltage suitable for charging the battery and charges the battery with the voltage as electric energy. For this battery charge, electret 11 in acceleration sensor 1 is adjusted to output a voltage value of an AC voltage generated by an acceleration determined as normal as a value with which a sufficient DC voltage can be obtained to charge a common battery.

Figure 4:
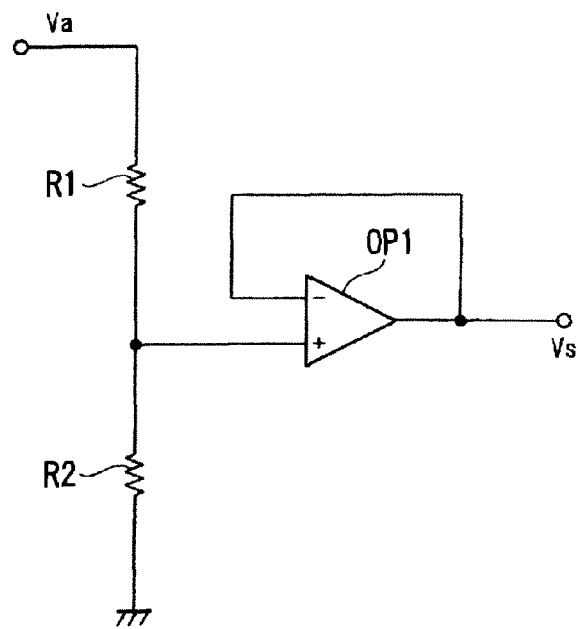
FIG. 4 is a conceptual diagram showing an example of a circuit configuration of conversion circuit 4 in FIG. 1.

Conversion circuit 4, as shown in FIG. 4, divides a DC voltage Va input from rectification unit 2 by resistance R1 (resistance value: r1) and R2 (resistance value: r2), and outputs a divided voltage Vs represented by the following formula, after impedance conversion by a voltage follower circuit composed of operational amplifier OP1:

$$Vs = Va \times \{r2/(r1+r2)\}$$

And, resistances R1 and R2 are set to have a high resistance compared to an output impedance of acceleration sensor 1, so that an AC voltage generated at acceleration sensor 1 can be output as a high voltage, and therefore, the output voltage can be efficiently supplied to power supply circuit 3 as electric energy for charging.

Comparator 5 compares the divided voltage Vs input from conversion circuit 4 with a set voltage Vt (threshold value) which is preset. With the comparative result, comparator 5 outputs an abnormal signal of L level (acceleration within a normal range) when the divided voltage Vs is the set voltage Vt or less, and it outputs an abnormal signal of H level (acceleration within an abnormal range) when the divided voltage Vs is more than the set voltage Vt. The set voltage Vt may be optionally changed to any value by a set voltage generation circuit (not shown in Figures) composed of a voltage-dividing circuit using a variable resistance etc., when the magnitude of an acceleration recognized as abnormal is changed or corresponding to adjustment of voltage dividing ratio in conversion circuit 4.

Control unit 6 activates detection unit 7 and recording unit 8 when the abnormal signal output from comparator 5 has changed from L level to H level, i.e., when abnormal acceleration (for example, acceleration exerted to electrode plate 13 by a vibration with an abnormal speed of rate of change) has been detected. On the other hand, when the abnormal signal has changed from H level to L level, i.e., when a normal acceleration has been detected, control unit 6 outputs a recording stop signal to stop detection unit 7 and recording unit 8.

Or, control unit 6 may be designed so that when the abnormal signal has changed from L level to H level, it outputs a recording end signal to stop detection unit 7 and recording unit 8 after a lapse of a predetermined measurement time after activating each circuit.

Here, in control unit 6, e.g. MPU is used, and the abnormal signal is input into IRQ (interrupt request) terminal. And, when the abnormal signal is input at L level, control unit 6 itself is also in a suspended state (when the abnormal signal is input to the internal IRQ terminal, functions other than starting MPU get into a suspended state) in order not to consume the power of the battery, and control unit 6 is designed so that it starts up when the abnormal signal has become H level. When a signal of H level is input to the IRQ terminal, an interrupt processing is started, i.e. control unit 6 gets into an activated state.

Detection unit 7 is composed of an A/D convertor, and it converts an analogue voltage value of divided voltage Vs to a digital value and outputs digital data of conversion result to recording unit 8.

And, detection unit 7 is designed so that it is not supplied with power from power supply unit 3 until the startup control signal is input from control unit 6. That is, detection unit 7 is normally in a state where power supply to A/D convertor is shut off by a switching means, and when a startup control signal is input, it connects the switching means to supply power. On the other hand, when a recording end signal is input, detection unit 7 disconnect this switching means to stop supplying power to the A/D convertor.

Recording unit 8 is, in the same manner as in the above detection unit 7, designed so that it disconnects or connects a channel to supply power to internal circuits by a switching means to control driving of its inner circuits. And, recording unit 8 has a memory unit composed of a nonvolatile memory, and after it is started, it sequentially writes digital data input through time from detection unit 7 along with information of time, to record data of acceleration.

That is, recording unit 8 is normally in a state such that power supply to its inner circuits is shut off by a switching means. And, when a startup control signal is input, recording unit 8 connects the switching means to supply power. On the other hand, when a recording end signal is input, recording unit 8 disconnects this switching means to stop supplying power to the A/D convertor.

In the above detection 7 and recording unit 8, control circuits to control their respective switching means are activated.

As described above, according to this embodiment, suspended detection unit 7 and recording unit 8 can be activated as triggered by an abnormal vibration detected by acceleration sensor 1 comprising electret 11. On the other hand, according to this embodiment, activated detection unit 7 and recording unit 8 can be suspended when the abnormal vibration ends. Therefore, according to this embodiment, it is possible to activate detection unit 7 and recording unit 8 only for a period when it is necessary to obtain data of acceleration, and the ratio of operating time of detection unit 7 and recording unit 8 can be reduced as compared to intermittent operation at regular intervals, and battery life can be prolonged. Control unit 6 may use MPU which has a built-in A/D convertor and a built-in memory having a sufficient capacity to record abnormal signals, which simplifies the circuit.

Figure 5:
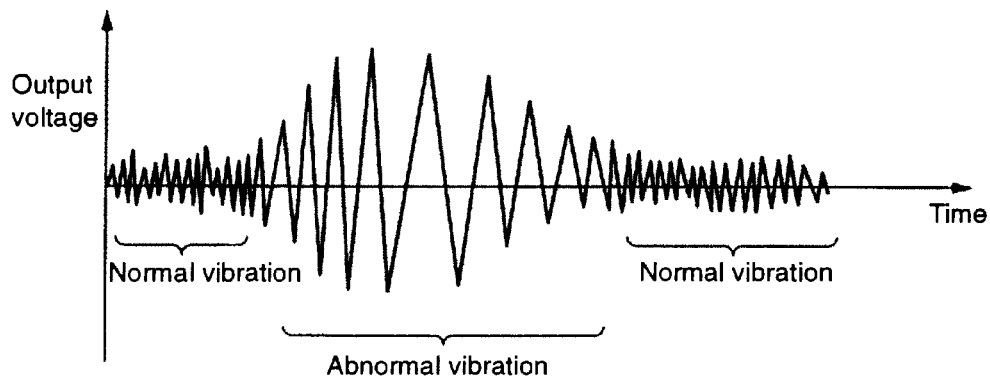
FIG. 5 is a waveform chart showing an output voltage waveform output by acceleration sensor 1.
Figure 6:
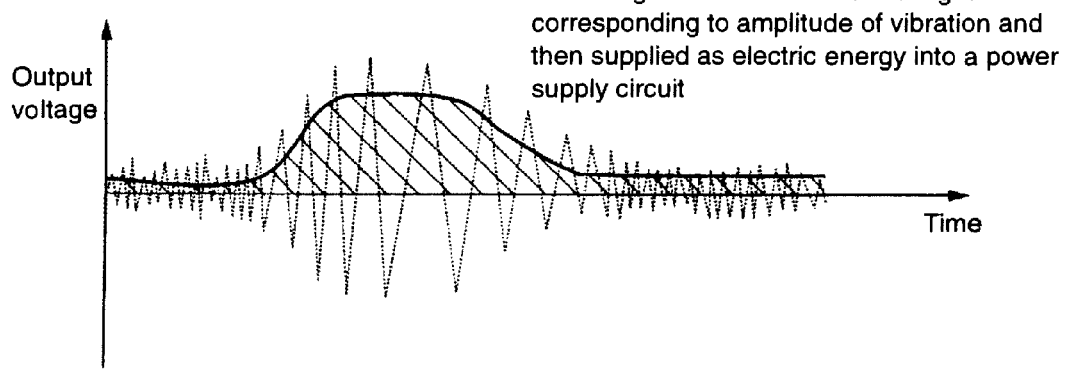
FIG. 6 is a waveform chart showing an output voltage waveform output by conversion circuit 4.
Figure 7:
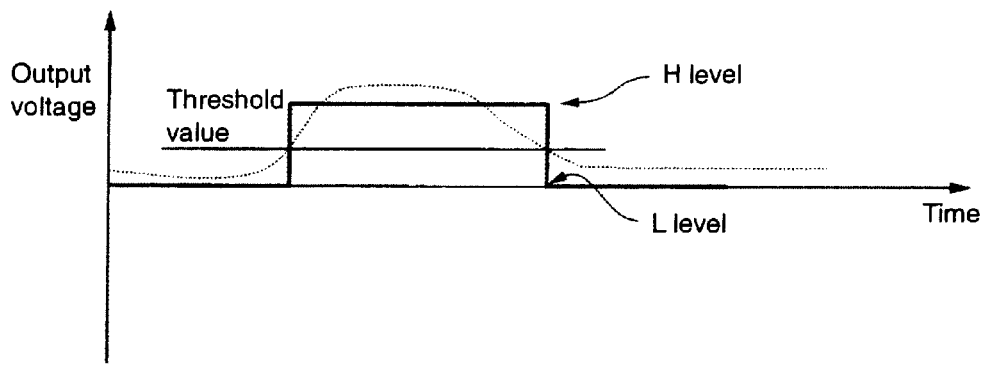
FIG. 7 is a waveform chart showing an output voltage waveform output by comparator 5.
Figure 8:
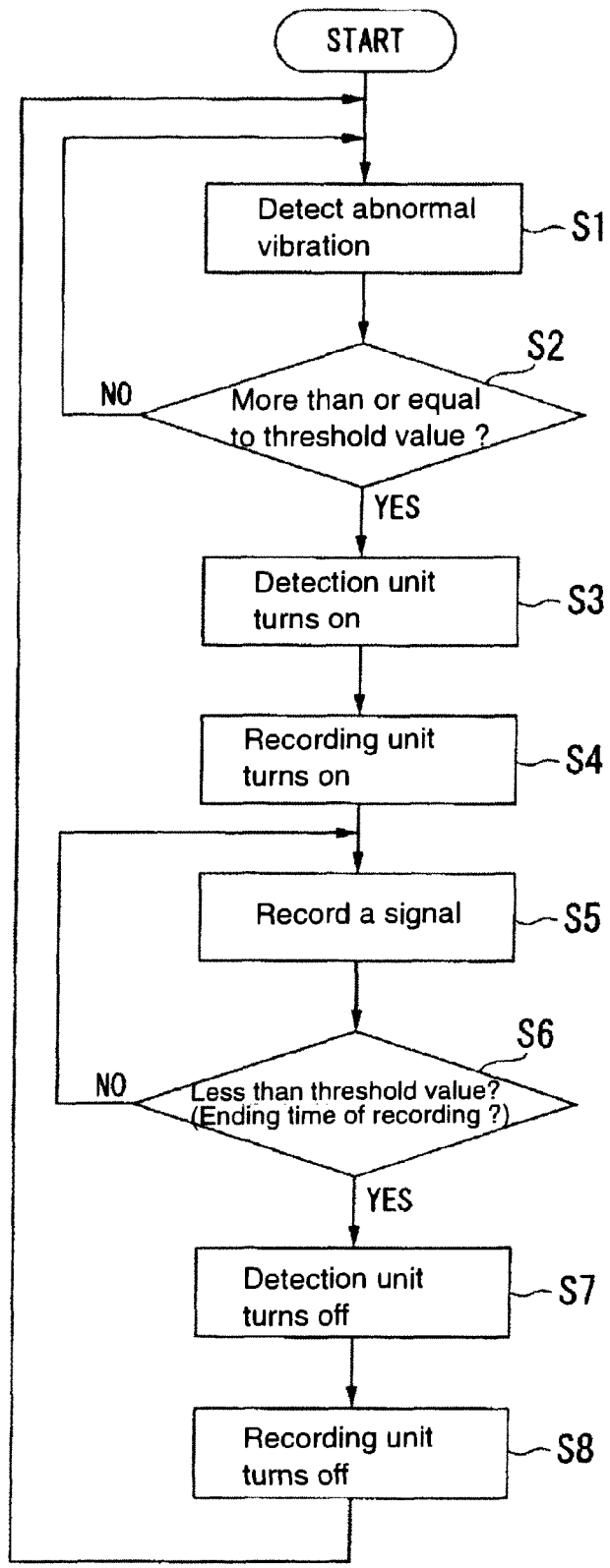
FIG. 8 is a flowchart showing an operation example of the acceleration sensor device according to the first embodiment.

Next, operation of the acceleration sensor device according to the first embodiment will be described with reference to FIG. 5, FIG. 6, FIG. 7 and FIG. 8. FIG. 5 shows an AC voltage output by acceleration sensor 1 corresponding to an exerted acceleration, wherein the horizontal axis represents time and the vertical axis represents voltage value output by acceleration sensor 1. FIG. 6 shows a DC voltage output by rectification unit 2, wherein the horizontal axis represents time and the vertical axis represents voltage value of DC voltage. FIG. 7 shows an output (abnormal signal) by comparator 5, wherein the horizontal axis represents time and the vertical axis represents voltage value of output voltage. FIG. 8 is a flow chart showing an operation example of the acceleration sensor device according to this embodiment.

Also with a naturally exerted vibration (in a range of normal vibration in FIG. 5), a voltage sufficient for power generation is output by acceleration sensor 1.

In a time range of normal vibration as shown in FIG. 5, divided voltage Vs output by conversion circuit 4 does not exceed predetermined set voltage Vt (threshold value) in the case of normal vibration, and thus comparator 5, as shown in FIG. 7, outputs an abnormal signal of L level, which means that the vibration is normal and not abnormal (step S1).

Consequently, control unit 6 does not activate itself, so that detection unit 7 and recording unit 8 are also maintained to be suspended, and they are in a state such that power consumption is suppressed.

And, comparator 5 determines whether or not an abnormal signal represents an abnormal vibration by which large acceleration is exerted as compared to the normal vibration, as shown in FIG. 7 (step S2).

Next, within a range of a state of an abnormal vibration as shown in FIG. 5, divided voltage Vs output by conversion circuit 4 exceeds the predetermined set voltage Vt (threshold value). Consequently, comparator 5 outputs an abnormal signal of H level, which means that the vibration is abnormal and large acceleration is exerted as compared to normal vibration, as shown in FIG. 7, to promote the procedure forward to step S3.

When an abnormal signal becomes H level, control unit 6 activates itself and outputs an activation control signal to activate detection unit 7 and recording unit 8 (step S3 and step S4).

And, detection unit 7 carries out A/D conversion of a divided voltage Vs divided from a DC voltage Va input from rectification unit 2, and outputs converted digital data to recording unit 8.

Recording unit 8 thereby stores the input digital data in an internal memory unit composed of a nonvolatile memory etc. every time (step S5).

Here, control unit 8 determines whether the abnormal signal input from comparator 5 is at H level or at L level (step S6).

And, when the vibration mode is changed from abnormal vibration to normal vibration, as shown in FIG. 5, the divided voltage Vs output by conversion circuit 4 becomes the set voltage Vt or less, whereby comparator 5 changes the abnormal signal from H level, which means a state of abnormal vibration, to L level, which means that the vibration is normal and not abnormal.

Therefore, control unit 6 outputs a recording end signal when the abnormal signal has changed from H level to L level, to suspend detection unit 7 and recording unit 8 (step S7 and step S8), and control unit 6 itself also becomes suspended, to make a state wherein power consumption is suppressed.

On the other hand, when the abnormal signal is at H level, control unit 6 brings the procedure back to step S5.

And, control unit 6 counts the time from when the abnormal signal has become H level i.e. itself has become activated. And, control unit 6 may be set so that it is permitted to output a recording end signal after the elapse of a preset measuring time for this count, to suspend detection unit 7 and recording unit 8.

<Second Embodiment>

Figure 9:
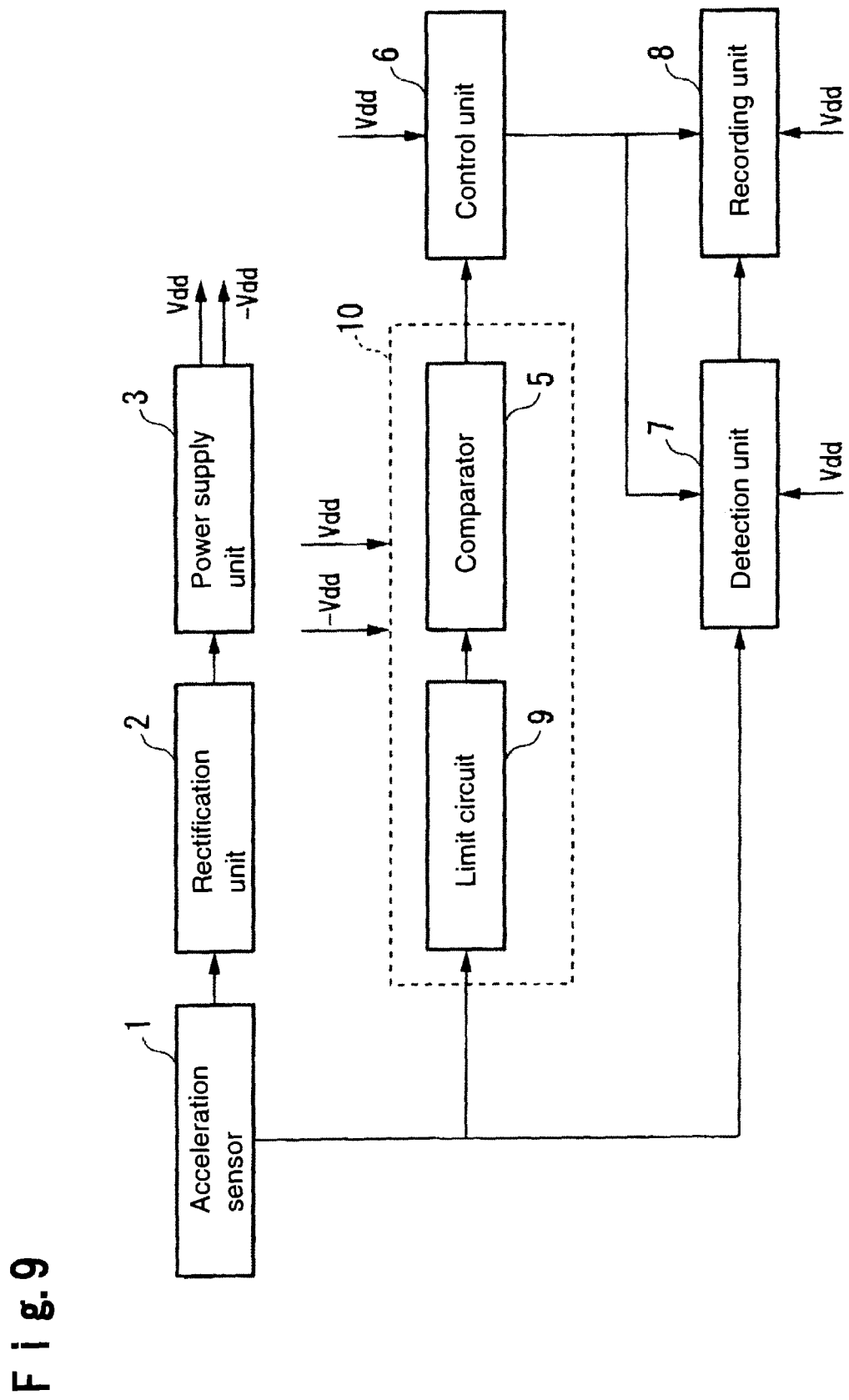
FIG. 9 is a block diagram showing a structural example of an acceleration sensor device according to the second embodiment of the present invention.

Next, the acceleration sensor device according to the second embodiment of the present invention will be described with reference to drawings. FIG. 9 is a block diagram showing a structural example of an acceleration sensor device according to this embodiment.

In this figure, the acceleration sensor device according to the embodiment has acceleration sensor 1, rectification unit 2, power supply unit 3, comparator 5, control unit 6, detection unit 7, recording unit 8 and limit circuit 9. With regard to the same components in FIG. 9 as in the first embodiment, the same symbols are appended, and their description will be omitted. Hereinafter, construction and operation different from the first embodiment will be described. And, comparator 5 and limit circuit 9 are supplied with operating voltages Vdd and −Vdd by power supply unit 3 for operation of an internal operational amplifier circuit.

Limit circuit 9 divides an AC voltage va output by acceleration sensor 1 to be within a range of detection, and outputs the divided voltage as a positive signal pulse to comparator 5.

Figure 10:
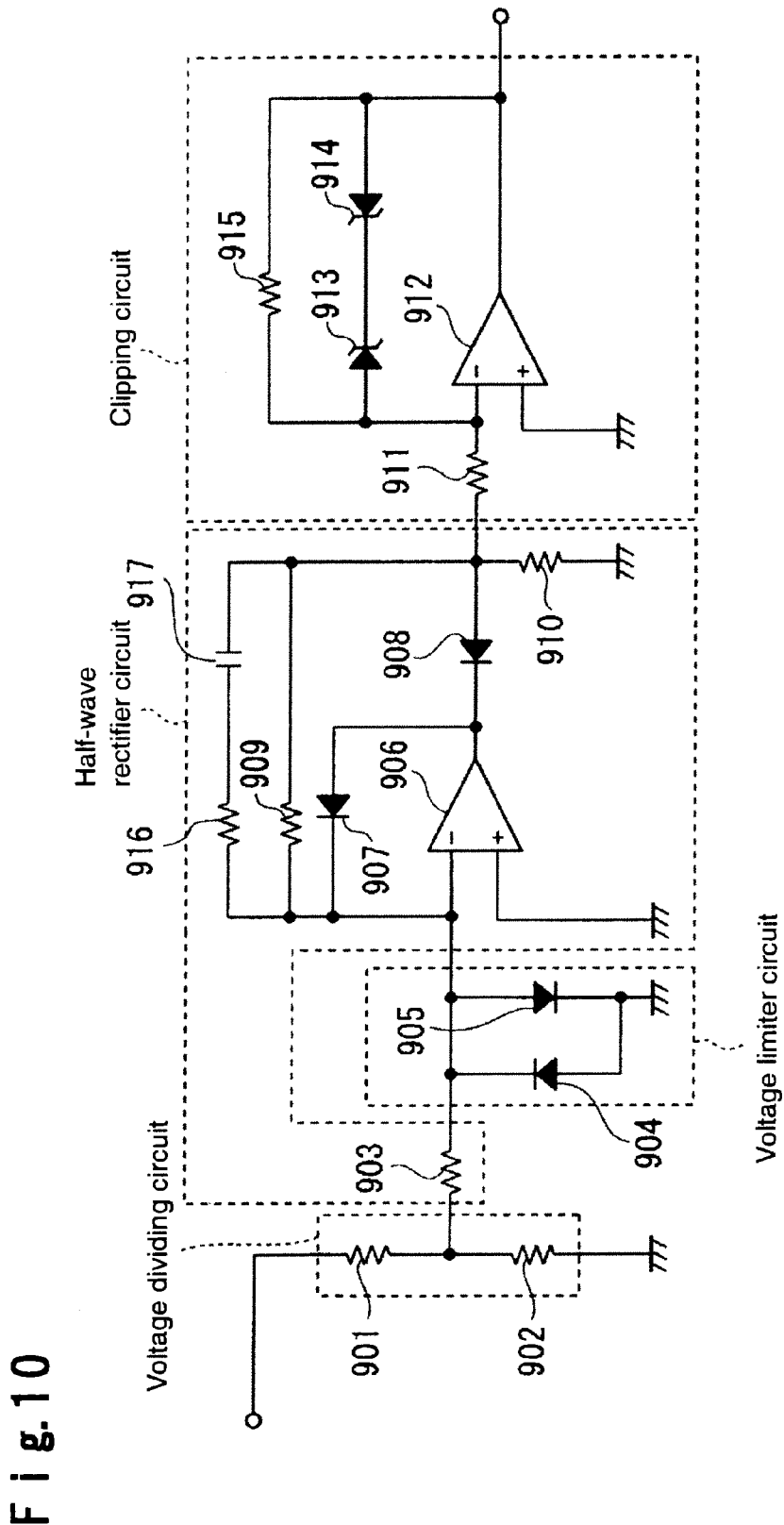
FIG. 10 is a conceptual diagram showing an example of a circuit configuration of limit circuit 9 in FIG. 9.

That is, the above limit circuit 9 is, as shown in FIG. 10, composed of a voltage-dividing circuit, a voltage limiter circuit, a half-wave rectifier circuit and a clipping circuit.

The voltage-dividing circuit is composed of resistance 901 (resistance value: r901) and resistance 902 (resistance value: r902), and it divides an AC voltage va input from acceleration sensor 1 to generate the following divided voltage vs:

$$vs = va \times \{r902/(r901+r902)\}$$

Here, resistances 901 and 902 are set to be high compared to an output impedance of acceleration sensor 1 to divide the AC voltage va with high accuracy. And, resistances 901 and 902 are set to be high compared to an output impedance of acceleration sensor 1 so that electric energy generated at acceleration sensor 1 is efficiently supplied to power supply circuit 3.

The voltage limiter circuit is composed of diodes 904 and 905, and it limits the voltage value of the AC voltage vs to be within a range of the width of a drop voltage of a forward voltage of diodes.

The half-wave rectifier circuit is composed of operation amplifier 906, diodes 907 and 908, capacitor 917 and resistances 903 (resistance value: r903), 909 (resistance value: r909), 910 and 916, and it converts an AC voltage vs which is halfwave-rectified and of which unnecessary noise is removed at the same time by resistance 916 and capacitor 917 working as a low-pass filter, into a pulse DC voltage Va' having a voltage gain of r909/r903, to be output.

The clipping circuit is composed of resistances 911 and 915, operational amplifier 912 and zener diodes 913 and 914, and it amplifies the DC voltage Va by a voltage gain set by resistances 911 and 915, clips an amplified DC voltage Va' in a range with a maximum value and a minimum value corresponding to breakdown voltages of zener diodes 913 and 914 to be voltage Vb, and outputs voltage Vb to comparator 5.

And, although detection unit 7 has the same construction as detection unit 7 in the first embodiment, it additionally has a function to divide an AC voltage from acceleration sensor 1, convert the divided AC voltage Vs into a DC voltage, and carry out A/D conversion. And, the rest of the construction and operation of detection unit 7 is the same as detection unit 7 in the first embodiment.

Figure 11:
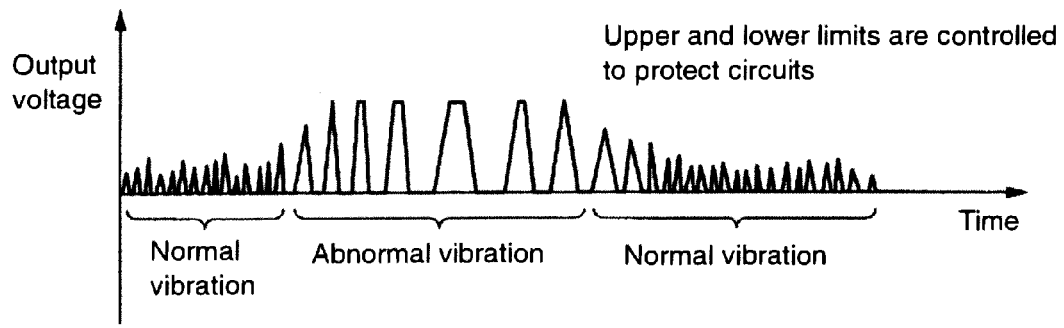
FIG. 11 is a waveform chart showing an output voltage waveform output by limit circuit 9.
Figure 12:
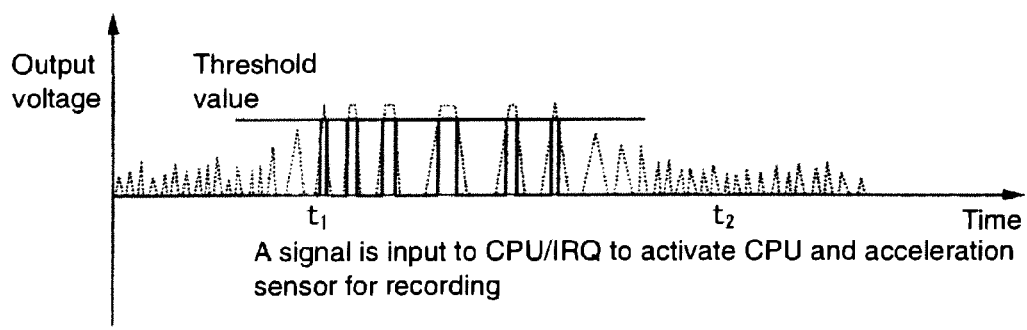
FIG. 12 is a waveform chart showing an output voltage waveform output by comparator 5.
Figure 13:
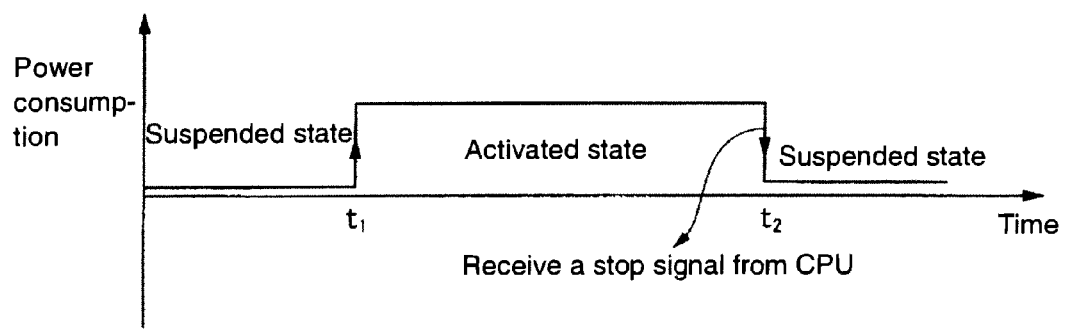
FIG. 13 is a waveform chart showing a state of power consumption by power consumption control by control unit 6 for each period of a normal vibration and an abnormal vibration.

Next, operation of the acceleration sensor device according to the second embodiment will be described with reference to FIG. 5, FIG. 6, FIG. 11, FIG. 12 and FIG. 13. FIG. 11 shows an output by limit circuit 9, wherein the horizontal axis represents time and the vertical axis represents voltage value of output voltage. FIG. 12 shows an output (abnormal signal) by comparator 5, wherein the horizontal axis represents time and the vertical axis represents voltage value of output voltage. FIG. 13 shows power consumption of the whole acceleration sensor device, wherein the horizontal axis represents time and the vertical axis represents electric power of power consumption.

Also with a naturally exerted vibration (in a range of normal vibration in FIG. 5), a voltage sufficient for power generation is output by acceleration sensor 1.

In a time range of normal vibration as shown in FIG. 5, the halfwave-rectified pulse DC voltage Vb output by limiter circuit 9 does not exceed the predetermined set voltage Vt (threshold value) in the case of normal vibration, and thus comparator 5, as shown in FIG. 12, outputs an abnormal signal of L level, which means that the vibration is normal and not abnormal.

Therefore, control unit 6 does not activate itself, and detection unit 7 and recording unit 8 are also maintained to be suspended, and thus, as shown in FIG. 13, the acceleration sensor device is in a state such that power consumption is suppressed.

Next, at time t1, when the vibration falls within a range of a state of abnormal vibration shown in FIG. 5, the halfwave-rectified pulse DC voltage Vb output by limiter circuit 9 exceeds the predetermined set voltage Vt (threshold value), and then comparator 5 outputs an abnormal signal as H level, which means the vibration is abnormal and large acceleration is exerted as compared to normal vibration.

As the abnormal signal has changed to H level, control unit 6 activates itself, and then outputs a startup signal to activate detection unit 7 and recording unit 8.

And, detection unit 7 carries out A/D conversion of the divided voltage Vs input from conversion circuit 4, which is divided from a DC voltage Va input from rectification unit 2, and outputs converted digital data to recording unit 8.

Then, recording unit 8 stores the input digital data in an internal memory unit composed of a nonvolatile memory etc. every time. At this time, as shown in FIG. 13, power consumption of the acceleration sensor device increases to a power consumption in the operating state.

And, control unit 6 counts the time from time t1 when normal vibration changes to abnormal vibration, i.e. the abnormal signal output by comparator 5 changes from L level to H level, and it determines whether or not the counted time exceeds the predetermined measuring time.

Next, at time t2 when the counted time exceeds the predefined measuring time, control unit 6 outputs an end signal to stop operation of detection unit 7 and recording unit 8 and makes itself suspended, whereby power consumption is suppressed. For this reason, power consumption of the acceleration sensor device is reduced, as shown in FIG. 13.

And, regardless of the above measuring time being counted, when the vibration mode is changed from abnormal vibration to normal vibration as shown in FIG. 5, a halfwave-rectified pulse DC voltage Vb output by limiter circuit 9 becomes less than the set voltage Vt, whereby comparator 5 changes the abnormal signal from H level representing an abnormal vibration to L level, which means the vibration is normal and not abnormal, as shown in FIG. 12.

<Additional Functions to the First and the Second Embodiments>

As already described, in the acceleration sensor devices according to the first and the second embodiments, comparator 5 compares a voltage output by acceleration sensor 1 corresponding to exerted acceleration (in fact, a voltage divided to be comparable by conversion circuit 4) with a set voltage Vt predetermined as a threshold value, and it outputs an abnormal signal when the voltage output by acceleration sensor 1 exceeds the set voltage Vt.

And, control unit 6 gets into an activated state from a suspended state, and detection unit 7 and recording unit 8 begin to be supplied with power from power supply unit 3. Detection unit 7 thereby converts the voltage value corresponding to the acceleration from acceleration sensor 1 to a digital value and outputs the digital value to recording unit 8. Recording unit 8 records input digital data (including information of recording time and date of abnormal vibration) in an internal memory unit corresponding to input time of this digital data. The recording process of this digital data is terminated when a voltage value output by acceleration sensor becomes less than the set voltage Vt and then control unit 6 changes from being in an activated state to a suspended state.

However, properties of an abnormal vibration depends on an environment of usage, and it is not clear whether acceleration exerted to acceleration sensor 1 is due to abnormal vibration; or such acceleration is due to vibration exerted unexpectedly in a normal state, due to disturbance vibration corresponding to a surrounding environment or due to normal vibration of a device wherein an acceleration sensor 1 is installed (a normal vibration), and therefore in essential data of vibration such as disturbance may be recorded. That is, if acceleration exerted to acceleration sensor 1 is determined as abnormal only by a voltage value as an instantaneous value output by acceleration sensor 1, the accuracy of whether the vibration which has brought this acceleration is abnormal vibration might be low.

Figure 14:
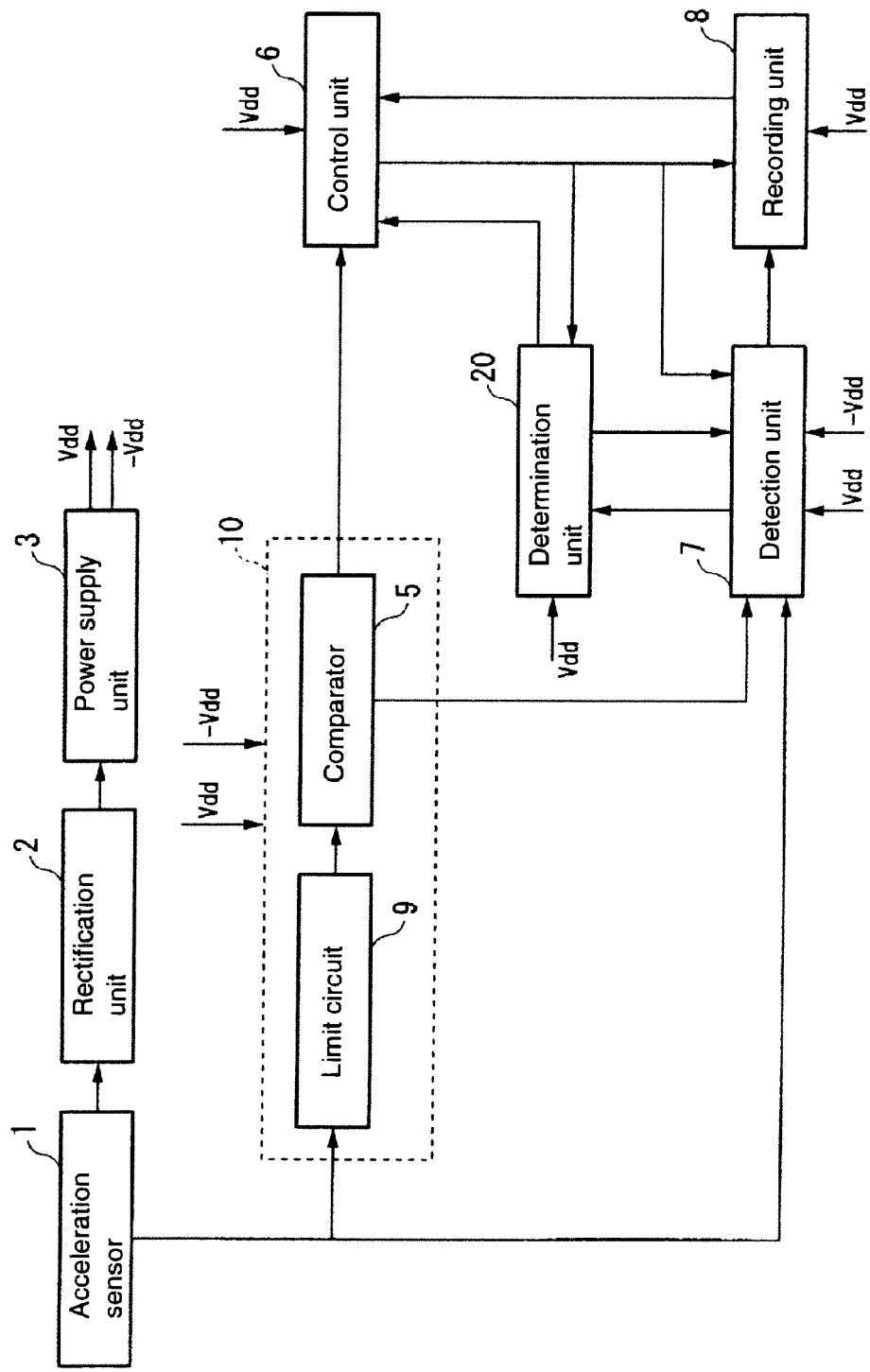
FIG. 14 is a block diagram showing a modified example of the acceleration sensor device according to the embodiment in FIG. 9.

To improve this situation, as shown in FIG. 14, a determination unit 20 may be arranged in the construction to determine whether vibration of an AC voltage output by acceleration sensor 1 due to vibration is abnormal vibration or non-abnormal vibration although having a vibration intensity exceeding a threshold value (vibration in an external environment, as it will be discussed later) when a voltage value output by acceleration sensor 1 exceeds a predetermined voltage Vt. This determination unit 20 is arranged, whereby digital data based only on vibration other than a predetermined vibration pattern can be recorded. And, by contrast, the device may be constructed so that digital data based only on a predetermined vibration pattern is recorded. FIG. 14 is a structural example of the second embodiment shown in FIG. 9 in which the above determination unit 20 is arranged. Hereinafter, the operation of the construction shown in FIG. 14 which is different from the construction shown in FIG. 9 will be described, wherein components operate in the same manner as in FIG. 9 are affixed with the same symbol as in FIG. 9.

Here, detection unit 7 in FIG. 14 has the same construction as detection unit 7 in FIG. 9 in the second embodiment, and, as shown in FIG. 4, it divides an AC voltage from acceleration sensor 1 to obtain a divided AC voltage Vs, it is connected to a voltage follower circuit composed of operational amplifier OP1, and further it has a function of A/D conversion. In order to enable these functions, detection unit 7 is supplied with working voltages Vdd and −Vdd. And, the determining process by determination unit 20 of match or similarity of vibration patterns will be described below. As described above, a Fourier transformed vibration pattern is used to determine whether digital data obtained by converting abnormal vibration detected by acceleration sensor 1 should be recorded by recording unit 8.

Figure 15:
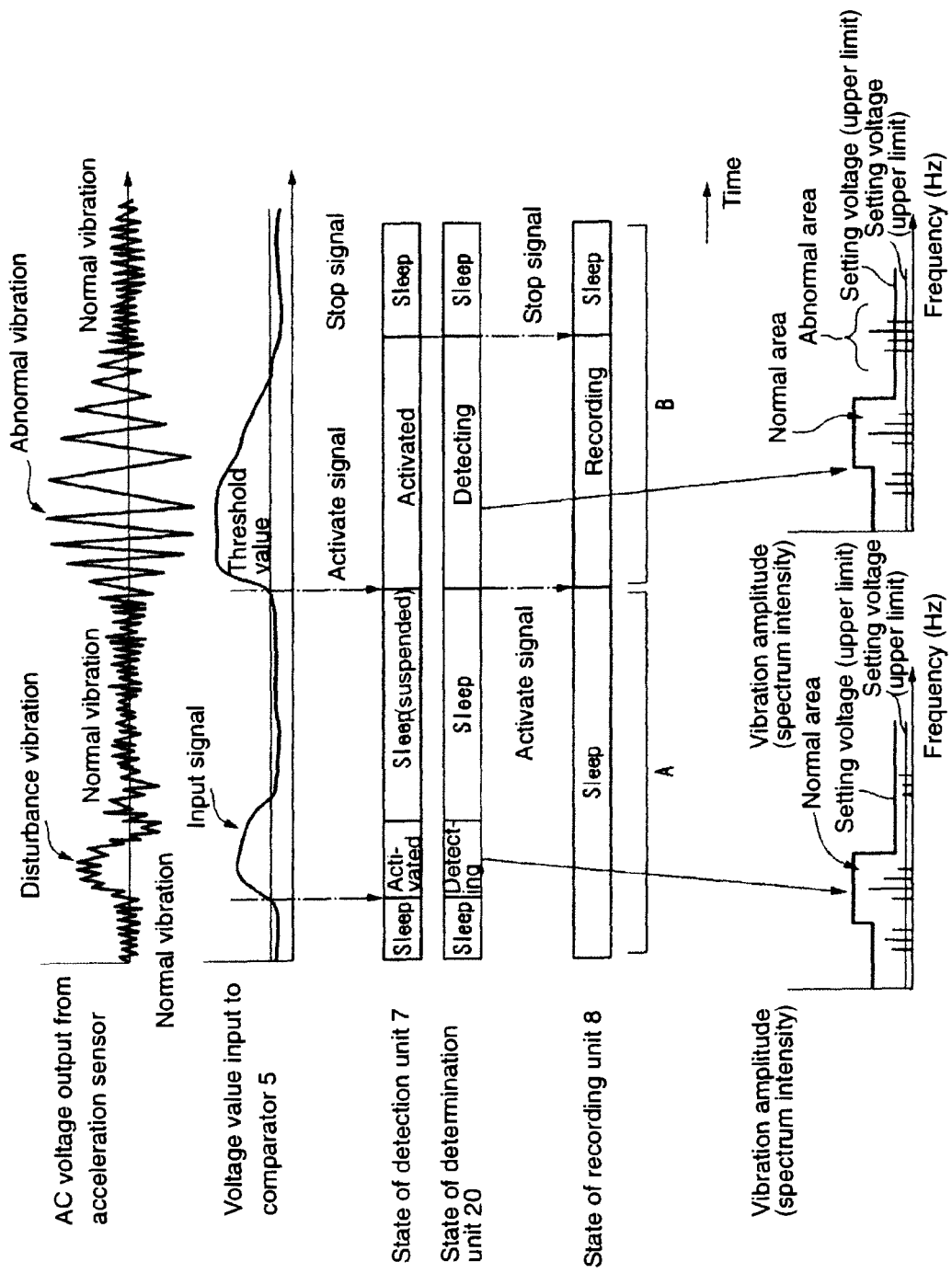
FIG. 15 is a conceptual diagram illustrating the operation of the acceleration sensor device in FIG. 14.

For example, in an environment at a place where abnormal vibration is monitored, when a disturbance vibration pattern which is a disturbance presents in an objective vibration pattern of which the cause is required to be analyzed, as shown in FIG. 15, if the disturbance vibration pattern exceeds the threshold value for comparator 5, in the second embodiment, control unit 6 is started and activates detection unit 7 and recording unit 8, and data is recorded in recording unit 8. When an objective vibration pattern is detected at a place where disturbance vibration highly-frequently appears, it is required to pick out when the digital data due to the objective vibration pattern is recorded.

And, a large amount of digital data corresponding to a disturbance vibration pattern is recorded, whereby the memory of recording unit 8 is wasted, and power consumption for this recording will be used.

For example, when an abnormal vibration by a motor used in a factory (due to e.g. loose of a mounting hardware or strain of a rotation axis) is detected as an objective vibration, if much disturbance vibration due to vibration of surrounding apparatus presents, it is required to inhibit digital data of the disturbance vibration due to the vibration of the surrounding apparatus from being recorded.

In many cases, the characteristic vibration of a motor in an abnormal condition of which motor objective vibration should be detected, and the characteristic vibration of a disturbance due to a surrounding environment where a motor is placed (including vibration exerted unexpectedly) are different. For this reason, immediately after acceleration sensor 1 is installed, the characteristic vibration of a disturbance due to a surrounding environment is preliminarily detected by using acceleration sensor 1, and a normal vibration pattern of a normal characteristic vibration and a disturbance vibration pattern of a disturbance are Fourier transformed. In this way, a reference vibration pattern representing a range containing a frequency of the characteristic vibration of the disturbance and a spectrum intensity for each frequency is generated. And, in this reference vibration pattern, a setting range with an upper limit and a lower limit of a spectrum intensity for each frequency (a normal area consisting of a frequency due to a disturbance vibration and a spectrum intensity in FIG. 15) is obtained, and this setting range is kept to be stored in the memory unit in determination unit 20.

And, in the actual detection process, determination unit 20 carries out Fourier transform of digital data of vibration which comparator 5 determines as abnormal vibration to generate an objective vibration pattern.

After generating the objective vibration pattern, determination unit 20 determines whether the spectrum intensity of each frequency of the objective vibration pattern is within the setting range, which is internally stored.

In this determination, when the spectrum intensity of each frequency in the objective vibration pattern is within the above setting range, which is predefined by a reference vibration pattern, determination unit 20 determines that the objective vibration pattern is a matched or similar pattern.

On the other hand, when the spectrum intensity of the objective vibration pattern is not within the setting range predetermined by the referential vibration pattern, determination unit 20 determines that the objective vibration pattern is a vibration pattern which is not matched or similar.

And, in the above determination, determination unit 20 may be designed to detect the analogy of shapes of the reference vibration pattern and the objective vibration pattern.

That is, in the objective vibration pattern and the reference vibration pattern consisting of a frequency and its corresponding spectrum intensity of each disturbance (in this case, a pattern consisting of a frequency and an average of the spectrum intensity of each disturbance corresponding to the frequency), determination unit 20 may obtain the difference of the spectrum intensity of each frequency and determine that they are similar when the total of this difference is within the predetermined setting range.

As described above, when a startup control signal is input from control unit 6, determination unit 20, in the same manner as detection unit 7, connects a switching means to be supplied with electric power from power supply unit 3 to be started, and when a stop control signal is input from control unit 6, detection unit 20 disconnect the switching means to be in a state such that it does not accept the supply of electric power from power supply unit 3, i.e. suspended state.

And, detection unit 20 stores a setting range (which has an upper limit and a lower limit of the spectrum intensity of each frequency) to compare digital data of an object to be determined with a Fourier transformed-objective vibration pattern in its internal memory unit.

And, determination unit 20 reads digital data of vibration which is temporarily stored in a buffer memory circuit of detection unit 7 and carries out Fourier transform of the read digital data to generate an objective vibration pattern consisting of a frequency and a spectrum intensity of each frequency.

And, determination unit 20 compares the above objective vibration pattern to determine whether or not it is within the setting range, and when the patterns are matched or similar, determination unit 20 outputs an end signal to control unit 6 in order to stop each unit (time region A in FIG. 15).

On the other hand, determination unit 20 compares the objective vibration pattern to determine whether or not the pattern is within the setting range, and when the patterns are not matched or similar, in order to have digital data corresponding to this compared vibration pattern recorded in recording unit 8, determination unit 20 outputs a write signal to output digital data of vibration which is temporarily stored in the buffer memory circuit of detection unit 7 to recording unit 8, and activates recording unit 8 and executes a write process (recording) (time region B in FIG. 15).

Figure 16:
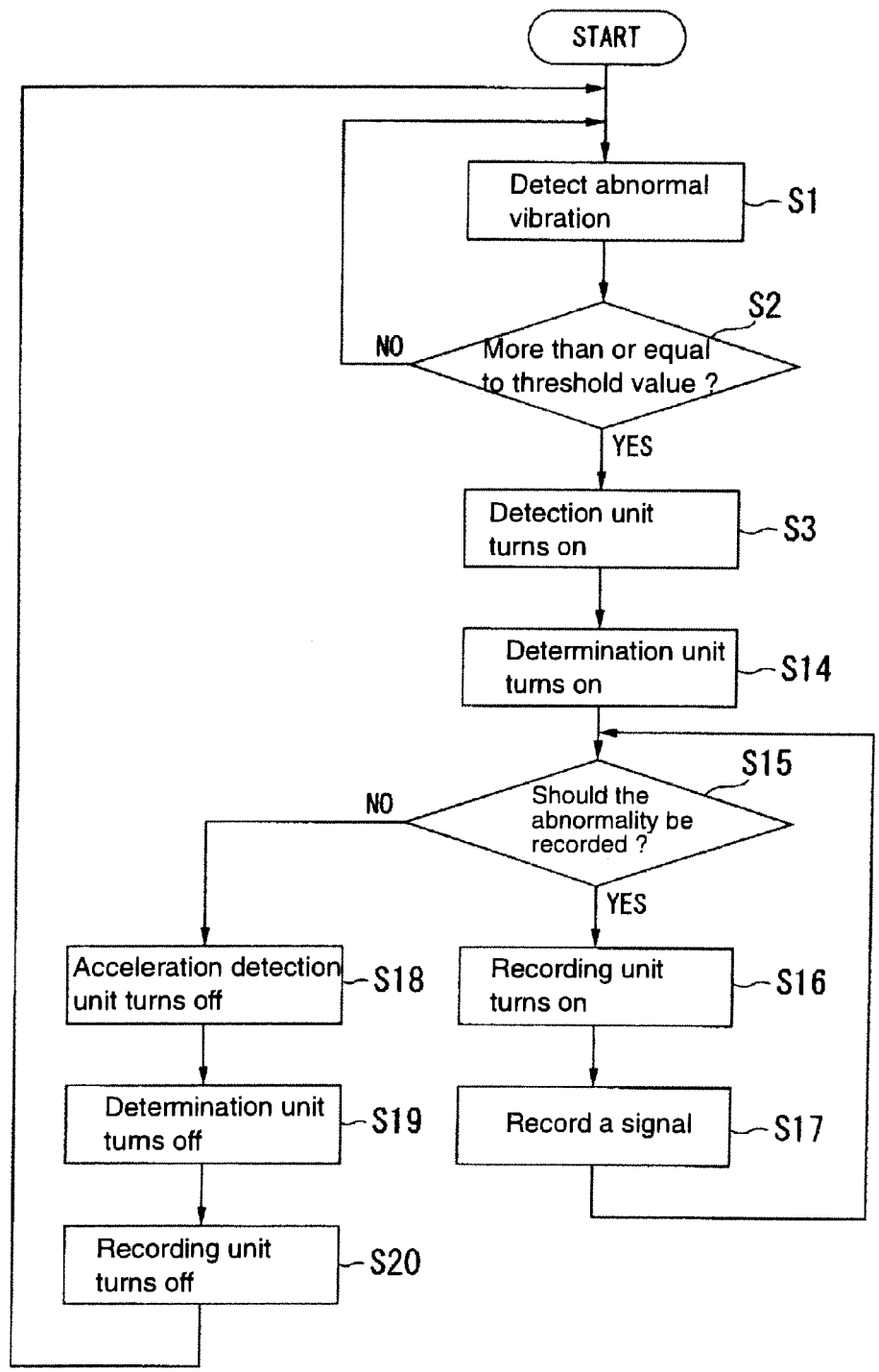
FIG. 16 is a flowchart showing an operation example of the acceleration sensor device shown in FIG. 14.

Next, the operation of an acceleration sensor device having the above determination unit 20 added will be described with reference to FIG. 14 and FIG. 16. FIG. 16 is a flow chart showing an operational example of an acceleration sensor device having determination unit 20 added.

Also with a naturally exerted vibration (a range of a normal vibration in FIG. 5), a voltage sufficient for power generation is output by acceleration sensor 1.

In the time range of a normal vibration shown in FIG. 5, a divided voltage Vs output by limit circuit 9 does not exceeds a predetermined set voltage Vt (threshold value) in the case of normal vibration, and thus comparator 5 outputs an abnormal signal at L level, which means the vibration is normal and not abnormal, as shown in FIG. 12 (step S1).

Therefore, control unit 6 does not start up itself, and thus detection unit 7 and recording unit 8 are also maintained to be suspended, and power consumption is suppressed.

And, comparator 5 determines whether or not the abnormal signal represents abnormal vibration to which a large acceleration is exerted as compared to normal vibration, as shown in FIG. 12 (step S2).

Next, when vibration becomes into a range of abnormal vibration shown in FIG. 5, a divided voltage Vs output by limit circuit 9 exceeds the predefined set voltage Vt. Comparator 5 thereby outputs an abnormal signal as H level which means the vibration is abnormal vibration and large acceleration is exerted as compared to normal vibration, and promotes the procedure forward to step S3.

When an abnormal signal has become H level, control unit 6 starts up itself and outputs a startup control signal to activate detection unit 7 and determination unit 20 (step S3 and step S14).

And, after detection unit 7 is activated, it carries out A/D conversion of a divided voltage va of an AC voltage input from acceleration sensor 1 and outputs a determination request signal to determination unit 20, as well as outputs A/D converted digital data.

When the determination request signal is input from detection unit 7, determination unit 20 temporarily stores the input digital data in the internal buffer memory unit, reads out them every predetermined time interval, carries out Fourier transform of a waveform represented by the digital data of this time interval to generate an objective vibration pattern representing the correspondence of a frequency and a spectrum intensity of the frequency, and stores the pattern in the memory unit in itself. This time interval is set to be n times the cycle of the objective vibration to be stored in recording unit 8, which is a sufficient time length to obtain a frequency and a spectrum intensity of the frequency.

And, determination unit 20 compares the setting range which is internally pre-stored, and a generated objective vibration pattern (step S15), and when they are matched or similar, it outputs an end signal to control unit 6 because it is not required to obtain digital data.

By this end signal, control unit 6 outputs a control signal to change a state into suspended to detection unit 7, to suspend detection unit 7 (step S18).

And, control unit 6 outputs a control signal to change a state into suspended to determination unit 20, to suspend determination unit 20 (step S19).

And, control unit 6 outputs a control signal to change a state into suspended to recording unit 8 to suspend recording unit 8 (step S20), promotes the procedure forward to step S1, and makes itself suspended to permit power consumption to be suppressed.

On the other hand, determination unit 20 needs to store the digital data when the patterns are neither matched nor similar, and therefore it outputs a control signal of the objective vibration pattern containing a time range, which is internally and temporarily stored, to recording unit 8 along with a time range which is internally stored.

Detection unit 7 thereby outputs a write signal to recording unit 8 to turn recording unit 8 on (step S16), and outputs digital data of the range corresponding to the above time range to recording unit 8.

By the input of the write signal, recording unit 8 stores the digital data of the time range in the internal memory unit (step S17), and when the storing of the digital data is completed, it promotes the procedure forward to step S15.

Then, determination unit 20 reads out digital data from detection unit 8 of a time range next to the time range which it has output to detection unit 7, carries out Fourier transform to generate an objective vibration pattern, and determines whether it is matched or similar by whether or not the objective vibration pattern is within the setting range (step S15).

By the above procedure, only necessary vibration patterns are recorded without a large amount of digital data corresponding to disturbance vibration patterns being recorded in recording unit 8, whereby the memory capacity of recording unit 8 can be effectively used, and the time of recording disturbance vibration patterns is reduced, which leads to reduction of power consumption.

And, determination unit 20 may be designed so that, when acceleration sensor 1 is installed to a detection object, determination unit 20 performs the obtaining process of a reference vibration pattern caused by vibration in a normal state and vibrations by disturbance for a specific period when the acceleration sensor 1 operates normally (for example for one week or one month) (training time) to store digital data in the memory unit.

And, after the specific period of time, determination unit 20 carries out Fourier transform of digital data of a plurality of vibrations stored in the memory unit to obtain a frequency and a spectrum intensity corresponding to the frequency. After the spectrum intensity is obtained, determination unit 20 performs a calculation process of the obtained spectrum intensity to calculate an average, a deviation, a maximum value, a minimum value, etc. of the spectrum intensity of each frequency, or compares the obtained spectrum intensity with the setting range having an upper limit and a lower limit, which is set initially. In this way, a spectrum intensity of frequencies of normal vibrations and vibrations which are unique to its installation location and which are not abnormal can be obtained with a high accuracy. That is, if a setting range having a newly obtained upper limit and lower limit is different from the initial setting, determination unit 20 resets the initial setting range taking the newly obtained upper limit and lower limit with the deviation into consideration, and sets a new setting range internally.

Further, when the environment is changed, for example, a new training period may be placed, and determination unit 20 may be configured so that, when it detects a cycle of the placed training period (by an internal timer), it extracts a reference vibration pattern due to normal vibration and disturbance vibration, sets a setting range having an upper limit and a lower limit of a spectrum intensity of each frequency by the above preprocessing and stores and sets the setting range in the internal memory unit.

And, although the above design is such that the converted digital data is temporarily stored in detection unit 8 while the abnormal signal of comparator 5 is at H level, the design may also be such that input digital data is sequentially sampled in time ranges of a time interval and whether or not the digital data should be recorded is determined for each digital data sampled in the time range.

In this way, determination unit 20 determines whether or not digital data of the time range should be stored in recording unit 8 by comparing the objective vibration pattern in the sampling time range with the setting range.

This comparing process and the operation after the comparing process are the same as the processes of step S15 and subsequent steps as described above with reference to FIG. 16. In this case, the digital data being subjected to determination will not be stored, and after an abnormal vibration becomes H level, determination is carried out only in the above time interval, whereby the power consumed in detection unit 7, recording unit 8 and determination unit 20 can be further reduced.

The above-described addition of determination unit 20 can be performed also in the second embodiment in the same manner as in the first embodiment.

<Another Embodiment in the First and the Second Embodiment>

As described above, the acceleration sensor of the present invention has two functions of generating power by vibration and sensing abnormal vibration.

However, these two functions cannot always be optimized at the same time. For example, it is one of such a case that electric power is generated by a normal vibration at normal time (a vibration having too low intensity to be detected as an abnormal vibration), a battery is charged with the generated electric energy while change of vibration (acceleration) is detected, and, when vibration of an abnormal time is detected, the acceleration of the abnormal vibration is recorded.

Normal vibration and abnormal vibration have different amplitudes and spectra, and it is necessary to optimize the vibration mechanism of an electret in order to increase the accuracy of measurement and recording of acceleration in abnormal vibration. However, in some cases, a voltage value of an AC voltage generated by a vibration may become small, and power generation efficiency by a normal vibration may become low.

In such a case, the design will be such that the process is divided into two steps, i.e. a step of generating power and detecting abnormal vibration and a step of detecting acceleration of abnormal vibration after abnormal vibration is detected, wherein this technical idea of dividing into two steps is a common concept in the first and the second embodiments, and an optimal acceleration sensor is allocated in each step in the construction.

The first step is a process wherein acceleration sensor 1 only generates power while detecting abnormal vibration, and the relative movement of electret 11 and conductor 13 in acceleration sensor 1 may be adjusted (tuned) to be in a power generation efficiency-focused mechanism.

The second step is a process wherein acceleration of vibration in abnormal vibration is measured after abnormal vibration is detected and the measurement result is recorded, and it does not require a power generating function for the following reason. Therefore, in order to measure acceleration within a detection range to be measured, an acceleration of abnormal vibration to be measured and an output voltage corresponding to this acceleration are set to the acceleration sensor, and the acceleration sensor is permitted to be optimized focusing not on a power generating voltage but on the measurement accuracy of an acceleration.

That is, an acceleration sensor which divides a large AC voltage corresponding to a power generation with a resistance having a high impedance which impairs the accuracy is not used, but an acceleration sensor which generates a voltage value corresponding to acceleration, which can be directly measured without dividing the voltage, is used. As a result, by the acceleration sensor in the second step, errors such as superimposed noises are suppressed and acceleration in abnormal vibration can be measured with a high accuracy.

That is, when an acceleration sensor to measure acceleration in abnormal vibration accurately is arranged in addition to an acceleration sensor for power generation and abnormal vibration detection, it is not necessary to generate power in this abnormal state because a period of abnormal vibration is extremely short as compared to a period of normal vibration. Therefore, even if this acceleration sensor for measuring acceleration of abnormal vibration does not have a function of power generation, draining of the battery can be significantly reduced by permitting this acceleration sensor to work only at the time of abnormal vibration.

Here, in the second step after abnormal vibration is detected, the acceleration sensor which actually measures acceleration of abnormal vibration may be composed of an acceleration sensor using an electret having a setting by an acceleration and a voltage corresponding to this acceleration. And, the acceleration sensor may be a commonly-used acceleration sensor which is composed of something other than an electret, such as semiconductor strain gauge type, servo type or piezoelectric body type.

That is, in the acceleration sensor device of the present invention, when an acceleration sensor to measure acceleration in abnormal vibration is used in addition to acceleration sensor 1 to generate power and detect abnormal vibration, control unit 6 disconnects the acceleration sensor used in the second step (which is arranged in detection unit 7) from the battery during the operation of the first step, and starts the second step when acceleration sensor 1 detects abnormal vibration exceeding a predetermined threshold value and outputting an abnormal signal.

In this second step, highly accurate measurement of acceleration and recording are carried out by the above additional acceleration sensor arranged in detection unit 7.

And, when acceleration has changed back to acceleration of normal vibration being less than or equal to a predetermined threshold value (by detection information from acceleration sensor 1) or when control unit 6 has detected elapse of a predefined time, control unit 6 stops the measurement of acceleration by the additional acceleration sensor by disconnecting power source, and control unit itself also changes to be in a stopped state.

As described above, the acceleration sensor device according to the first or the second embodiment of the present invention, including the case where an additional acceleration sensor for measurement of abnormal signals is arranged, shortens operating time of the circuit blocks such as control unit 6 having a relatively large-scale circuit and consuming a large current, detection unit 7 to measure acceleration of an acceleration sensor and recording unit 8 to record measurement results, as much as possible, while it maintains the performance of acceleration measurement and recording function.

<Arrangement Examples of Acceleration Sensor 1 in the First and the Second Embodiments of the Present Invention>

Figure 17:
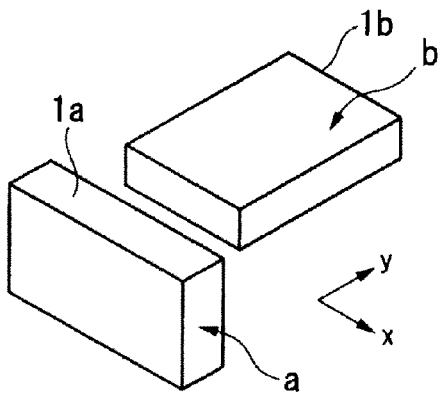
FIG. 17 is a conceptual diagram showing positions of acceleration sensors to measure a two-dimensional vibration by means of the acceleration sensor device in the first embodiment or second embodiment.

Next, FIG. 17 shows an arrangement example of acceleration sensors 1*a* and 1*b* according to the first and the second embodiments. Acceleration sensors 1*a* and 1*b* are arranged so that they correspond to their vibration directions i.e. direction a and direction b which is perpendicular to direction a, respectively. That is, as to acceleration sensor 1*a*, the direction of relative movement of conductor 13 to electret 11 is on the axis parallel to direction a. And, as to acceleration sensor 1b, the direction of relative movement of conductor 13 to electret 11 is on the axis parallel to direction b. The above relative movement means that the surfaces of electret 11 and conductor 13 arranged to face each other move relatively in a state where they are parallel, i.e. move parallel.

As described above, acceleration sensors are arranged in perpendicular two directions i.e. direction a (direction of x-axis) and direction b (direction of y-axis), whereby accelerations in two directions can be detected.

And, in the above acceleration sensors 1a and 1b, electret 11 is arranged between two conductors 12 and 13, and electret 11 is fixed to conductor 12. Although the construction described above is such that this electret 11 moves parallel relatively to the facing conductor 13, by contrast, the construction may be such that electret 11 is fixed to conductor 13 and moves parallel relatively to the facing conductor 12. Here, the acceleration sensor may be arranged vertically or horizontally as long as electret 11 is arranged so that it may move parallel relatively to one of the conductors facing each other. (Here, "vertically or horizontally" means that when the relative-parallel movement of electret 11 and conductor 13 is parallel to the direction of acceleration of vibration of a measurement object, the acceleration sensor may be arranged in any position as long as it is on a plane parallel to this direction.)

Figure 18:
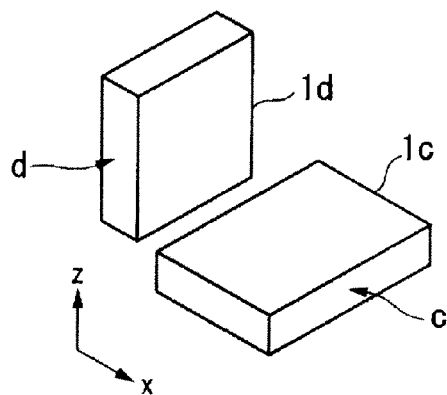
FIG. 18 is a conceptual diagram showing positions of acceleration sensors to measure a two-dimensional vibration by means of the acceleration sensor device in the first embodiment or second embodiment.

And, FIG. 18 shows an arrangement example of acceleration sensors 1c and 1d according to the first and the second embodiments. Acceleration sensors 1c and 1d are arranged so that they correspond to their vibration directions i.e. direction c and direction d perpendicular to direction c, respectively. That is, as to acceleration sensor 1c, the direction of relative movement of conductor 13 to electret 11 is on the axis parallel to direction c. And, as to acceleration sensor 1d, the direction of relative movement of conductor 13 to electret 11 is on the axis parallel to direction d.

As described above, acceleration sensors are arranged in perpendicular two directions i.e. direction c (direction of x-axis) and direction d (direction of z-axis), whereby accelerations in two directions can be detected.

And, in the above acceleration sensors 1c and 1d, electret 11 is arranged between two conductors 12 and 13, and electret 11 is fixed to conductor 12. The construction described above is such that the parallel movement is relatively to the facing conductor 13. However, another construction may be such that electret 11 is, by contrast, fixed to conductor 13, and it moves parallel relatively to the facing conductor 12. Here, the acceleration sensor may be arranged vertically or horizontally as long as electret 11 is arranged so that it may move parallel relatively to one of the two facing conductors.

Figure 19:
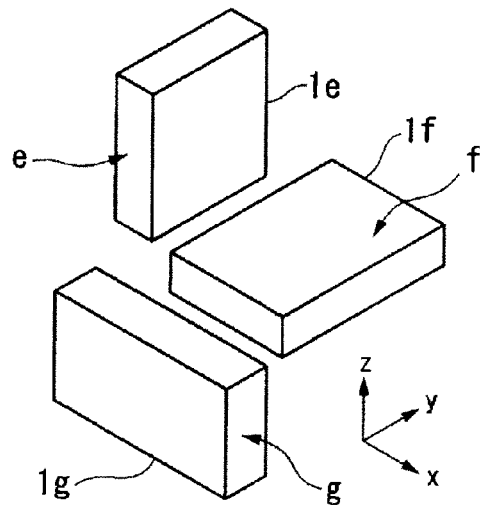
FIG. 19 is a conceptual diagram showing positions of acceleration sensors to measure a three-dimensional vibration by means of the acceleration sensor device in the first embodiment or second embodiment.

And, FIG. 19 shows an arrangement example of acceleration sensors 1g, 1f and 1e according to the first and the second embodiments. Acceleration sensors 1g, 1f and 1e are arranged to correspond to vibration directions of direction g, direction f perpendicular to this direction g and direction e perpendicular to a plane determined by direction g and direction f, respectively. That is, as to acceleration sensor 1g, the direction of relative movement of conductor 13 to electret 11 is on the axis parallel to direction g. And, as to acceleration sensor 1f, the direction of relative movement of conductor 13 to electret 11 is on the axis parallel to direction f. And, as to acceleration sensor 1e, the direction of relative movement of conductor 13 to electret 11 is on the axis parallel to direction e.

As described above, the acceleration sensors are arranged in perpendicular three directions i.e. direction g (direction of x-axis), direction f (direction of y-axis) and direction e (direction of z-axis), whereby accelerations in three directions can be detected.

And, in the above acceleration sensors 1g, 1f and 1e, the construction described above is such that electret 11 is arranged between two conductors 12 and 13 and fixed to conductor 12, and it moves parallel relatively to the facing conductor 13. However, the construction may be such that electret 11 is, by contrast, fixed to conductor 13 and moves parallel relatively to the facing conductor 12.

For example, when acceleration sensors are arranged in directions of north-south, east-west and vertical, which are perpendicular to one another, three-dimensional movement of ground can be comprehended, and they can be used as a seismometer. Shaking of earthquakes is various as being at a level of μm of amplitude or being long-period and large-amplitude. That is, an earthquake may be a microearthquake having an amplitude of several nanometers and a frequency of tens of Hz or a large earthquake having an amplitude of several meters and a period of tens of seconds, and the acceleration sensors can be used for various amplitude by modifying the mechanism of relative-parallel movement of an electret and its facing conductor. Here, an acceleration sensor may be arranged vertically or horizontally as long as electret 11 is arranged so that it can move parallel relatively to one of the facing conductors.

And, each of the acceleration sensors in FIG. 17, FIG. 18 and FIG. 19 constitutes an acceleration sensor device. That is, each of acceleration sensors 1a, 1b, 1c, 1d, 1e, 1f and 1g constitutes one acceleration sensors device of FIG. 1 or FIG. 9.

<Explanation of Electret Used in the First and the Second Embodiments of the Present Invention>

Next, the electret used in acceleration sensor 1 will be explained.

Materials to form electret 11 in this embodiment include a variety of resins.

Specific examples of the resins include a polyolefin such as a fluoropolymer, a cycloolefin polymer, polyethylene or polypropylene; an ethylenic copolymer such as a ethylene/vinyl acetate copolymer, an ethylene/(meth)acrylic acid copolymer, an ethylene/itaconic acid copolymer, an ethylene/maleic anhydride copolymer or an ethylene/vinyl alcohol copolymer; polyacrylonitrile; polyester; polyamide; polycarbonate; polystyrene; an acryl/styrene copolymer (AS) resin; an acryl/butadiene/styrene copolymer (ABS) resin; a polyurethane resin; polyvinyl chloride; polyphenylene oxide; a polyacetal; a polysulfone; a polyketone; a polyimide; and a cellulose ester.

When the above copolymer with an unsaturated carboxylic acid is used, such a copolymer neutralized with an alkaline-earth metal ion may be used. The alkaline-earth metal ion is preferably magnesium or calcium.

Examples of the cycloolefin polymer include a cycloolefin containing repeating units having an aliphatic ring structure in its main chain such as an addition copolymer of a norbornene and an olefin, a hydrogenated polymer of a ring opening-metathesis polymer of a norbornene, a transannular polymer of an alkylidene norbornene, an addition polymer of a norbornene, a hydrogenated polymer of a 1,2- or 1,4-addition polymer of cyclopentadiene, a hydrogenated addition polymer of a 1,2- or 1,4-addition polymer of cyclohexadiene or a cyclic polymer of a conjugate diene.

Examples of the fluoropolymer include polytetrafluoroethylene (PTFE), a modified polytetrafluoroethylene (modified PTFE), polyvinylidene fluoride (PVDF), a vinylidene fluoride/trifluoroethylene copolymer (VDF-TrFE), a vinylidene fluoride/tetrafluoroethylene copolymer, a tetrafluoroethylene copolymer/hexafluoropropylene copolymer (FEP), a tetrafluoroethylene/ethylene copolymer (ETFE), a polytetrafluoroethylene/propylene copolymer, a tetrafluoroethylene/perfluoro(alkyl vinyl ether) copolymer (PFA), polychlorotrifluoroethylene (PCTFE), trifluorovinyl acetate homopolymer and a copolymer of trifluorovinyl acetate and an ethylenic unsaturated compound. One of such fluoropolymers may be used alone, or two or more of them may be used in combination.

The fluoropolymer is preferably a polymer having a fluoroaliphatic ring structure. The polymer having a fluoroaliphatic ring structure is more preferably a polymer having a fluoroaliphatic ring structure in its main chain obtained by cyclopolymerizing a fluoromonomer having two or more polymerizable double bonds.

"Having a fluoroaliphatic ring structure in its main chain" means having a structure wherein at least one carbon atom constituting an aliphatic ring is a carbon atom in a carbon chain constituting a main chain and a fluorine atom or a group containing a fluorine atom is bonded to at least a part of carbon atoms constituting the aliphatic ring. The fluoroaliphatic ring structure may contain one or more ethereal oxygen atoms.

Specific examples of the polymer having a fluoroaliphatic ring structure include a homopolymer of a monomer having a fluoroaliphatic ring structure such as a perfluoro(1,3-dioxol) such as perfluoro(2,2-dimethyl-1,3-dioxol), perfluoro(1,3-dioxol) or perfluoro(4-methoxy-1,3-dioxol), or a perfluoro (2-methylene-1,3-dioxolane) such as perfluoro(2-methylene-4-methyl-1,3-dioxolane) or perfluoro(2-methylene-4-propyl-1,3-dioxolane); or a copolymer of such a monomer having a fluoroaliphatic ring structure with another fluoromonomer. Here, examples of the other fluoromonomer include a fluoroolefin such as tetrafluoroethylene, chlorotrifluoroethylene, hexafluoropropylene or vinylidene fluoride; or a perfluoro(alkyl vinyl ether) such as perfluoro(methyl vinyl ether).

Examples of the polymer having a fluoroaliphatic ring structure in its main chain obtained by cyclopolymerizing a fluoromonomer having two or more polymerizable double bonds are known by publications of JP-A-63-238111, JP-A-63-238115, etc. Such examples include a cyclic polymer of a fluoromonomer having two or more polymerizable double bonds such as perfluoro(allyl vinyl ether) or perfluoro(butenyl vinyl ether); and a copolymer of a fluoromonomer having two or more polymerizable double bonds with a radical-polymerizable monomer such as tetrafluoroethylene. Or, it may be a polymer obtained by copolymerizing a monomer having a fluoroaliphatic ring structure such as perfluoro(2,2-dimethyl-1,3-dioxol) with a fluoromonomer having two or more polymerizable double bonds such as perfluoro(allyl vinyl ether) or perfluoro(butenyl vinyl ether).

The polymer having a fluoroaliphatic ring structure is preferably a polymer having a fluoroaliphatic ring structure in its main chain, and it preferably contains at least 20 mol % of monomer units having a fluoroaliphatic ring structure in monomer units forming the polymer from the viewpoint of mechanical properties, etc.

The polymer having a fluoroaliphatic ring structure in its main chain is preferably CYTOP (registered trademark, manufactured by Asahi Glass Company, Limited), and such a known fluoropolymer may be used in the present invention.

The polymer may contain a proper electrostatic adjuster or a mixture of a proper electrostatic adjuster. The electrostatic adjuster may be, for example, triphenylmethane or its derivative, an ammonium compound, a high-molecular ammonium compound, an immonium compound, an aryl sulfide compound, a chromium azo complex or a diallyl ammonium compound.

If the polymer having a fluoroaliphatic ring structure as described above is used to form electret 11 by a method such as spin coating, the thickness of electret 11 is permitted to be at least 10 μm.

When the electrostatic induction conversion device used in this embodiment is used as a electric generator, the maximum power generation output Pmax is represented by the following formula:

$$P\max=[\sigma^2 \cdot n \cdot A \cdot 2\pi f]/[(\epsilon\epsilon_O/d)\cdot((\epsilon_g/d)+1)]$$

wherein σ is surface charge density of electret 11, n is pole number i.e. the number of electret 11, A is area of electrode plate 13, f is frequency of reciprocating movement of conductor 12, d is thickness of electret 11, g is distance between electret 11 and electrode plate 13 and ε is relative permittivity.

As the above formula implies, the power generation output becomes larger as thickness d of electret 11 is larger. As to a material conventionally used for an electret, when it is processable into a strip of at most 1 mm, it has been possible to make electret 11 having a thickness d of at best from about several micrometers to 10 μm; however, when the polymer having a fluoroaliphatic ring structure is used, thickness d of electret can be at least 10 μm as described above, and therefore it is preferred as a material for electret 11.

And, the electric breakdown strength of the above polymer having a fluoroaliphatic ring structure, CYTOP (registered trademark), is 11 kV/0.1 mm, which is higher than the electric breakdown strength of Teflon (registered trademark) AF, which is a conventionally used material, i.e. 5 kV/0.1 mm. If the electric breakdown strength can be heighten, charge-injection amount to electret 11 can be increased and the sensitivity of a sensor wherein electret 11 is used as a sensor can be improved.

As described above, high power generation ability of electret 11 is effective to improve the sensitivity of an acceleration sensor, and at the same time, it can be utilized also as an auxiliary power for peripheral circuits of the acceleration sensor. By the relative movement of electret 11 and electrode plate 13, induced charge changes and a very high AC voltage is generated. The magnitude of this AC voltage depends on the acceleration exerted to electret 11, and thus a part of this AC voltage is divided by resistances R1 and R2 (bleeder resistances) and recovered to be output as a sensor signal to detection unit 7.

On the other hand, in order to increase an input impedance of conversion circuit 4, the resistance values of resistances R1 and R2 are increased and the input impedance of the voltage follower composed of operational amplifier OP1 is increased, whereby the electric power generated by acceleration sensor 1 comprising electret 11 is little consumed.

So the AC voltage generated by acceleration sensor 1 can be used for charging a battery (secondary battery) via rectification unit 2. Here, the battery may be a chemical secondary battery such as a lithium-ion secondary battery or a nickel-hydrogen battery, or a power capacitor such as an electric double layer capacitor. Further, a chemical secondary battery and a power capacitor may be used in combination.

<Application of Acceleration Sensor Device According to the First or the Second Embodiment of the Present Invention>

At some places where the acceleration sensor devices according to the first or the second embodiment is installed or in some applications of the acceleration sensor device, mechanical vibration is constantly exerted to the sensor. For example, application to abnormal detection of motors may be one of such a case. Electric power is generated by vibration of a motor when it normally operates (normal vibration), and the battery is charged using electric energy obtained by this power generation; and on the other hand, such electric energy can also be used to detect abnormal vibration when the abnormal vibration is generated by a motor by deformation of a shaft or a load change.

Here, if power consumption of each circuit of the acceleration sensor device can be reduced to lower than the power generated by acceleration sensor 1 using an electret, there is no need of arrange a battery, and the device can be miniaturized and its price can be reduced.

And, even if it is expected that power generation exceeding power consumption of each circuits of acceleration sensor device cannot be obtained by acceleration sensor 1 using an electret, it has an effect of prolonging battery life as compared to a conventional sensor device which operates with power supplied by a battery, utilizing the function of an auxiliary power for battery charge.

Figure 20:
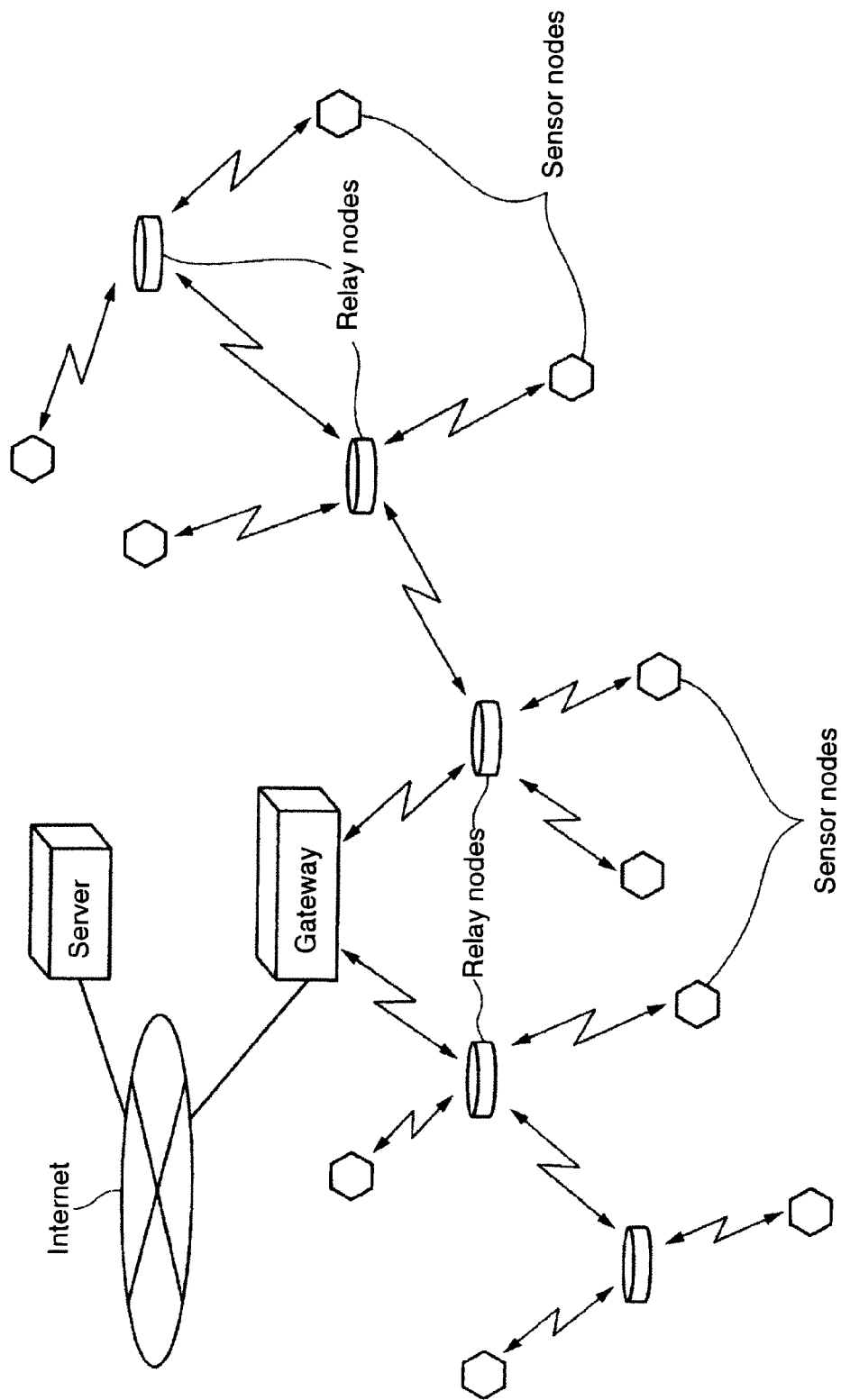
FIG. 20 is a conceptual diagram showing a structural example of an wireless sensor network system using the acceleration sensor device in the first embodiment or second embodiment.

For example, FIG. 20 shows a wireless sensor network system to transmit data of abnormal vibration to a server on the internet via a gateway, wherein a wireless transceiver to transmit and receive data wirelessly is prepared for an acceleration sensor device to make up a sensor node, and such sensor nodes constitute a plurality of sensor networks via relay nodes. Here, the server records time of occurrence of abnormal vibration received from each sensor node and the magnitude of the abnormal vibration in a database corresponding to the installation location of each sensor node (or identification number of each sensor), and it detects earthquakes in a wide area or states of a plurality of objects (for example, the above described motor).

As to the above application of the acceleration sensor device according to the first or the second embodiment to a wireless sensor network, it is expected that a peak power consumption during measurement of vibration will be quite large as the scale of wireless transmission and reception or the scale of each circuit in a device expands.

However, power generated by a acceleration sensor is utilized as an auxiliary power function, whereby a battery life can be prolonged.

Here, of course, all system operating conditions such as communication protocols, microcomputer control programs, and frequency and timing of sensing and communications are optimized to prolong the battery life by utilizing this auxiliary power function.

A program to perform functions of control unit 6 and recording unit 8 (function to record data except a memory) in the acceleration sensor device of FIG. 1 and FIG. 9; control unit 6 and recording unit 8 (a function to record data except a memory) in FIG. 14; and determination unit 20 may be stored in a computer-readable recording medium, and the program stored in this recording medium may be loaded into a computer system and executed to handle the operation control of an acceleration sensor. The term "computer system" includes an OS and hardwares such as peripherals. And, "computer system" includes a WWW system having a web page-serving environment (or a display environment). And, a "computer-readable recording medium" means a removable medium such as a flexible disk, a magnet optical disk, a ROM or a CD-ROM, or a storage device built into a computer system such as a hard disk. Further, a "computer-readable recording medium" includes a recording medium holding a program for a certain period of time, such as a volatile memory (RAM) in a computer system as a server or a client at the time of transmission of a program via a network such as the internet, or a communication line such as a telephone line.

And, the above program may be transmitted from a computer system storing this program in a storage device, etc. to another computer system via a transmission medium or on a transmitting wave in a transmission medium. Here, the "transmission medium" to transmit a program means a medium having a function of transmitting information, including a network (communication network) such as the internet or a communication line (communication wire) such as a telephone line. And, the above program may be a program to perform a part of the above described functions. Further, it may be a program which can perform the above functions in combination with another program which has been already stored in the computer system, i.e. a difference file (difference program).

Embodiments of the present invention are described as above with reference to drawings. However, a specific construction is not limited to these embodiments, and designs or the like without departing from the scope of the invention may also be included.

Industrial Applicability

The acceleration sensor device of the present invention may be used as a seismometer. And, a sensor network system using such a device may be utilized for monitoring of equipments in a large chemical plant, maintenance of structures such as roads, bridges and dams, prediction of landslides, and so on.

The entire disclosure of Japanese Patent Application No. 2008-093278 filed on Mar. 31, 2008 including specification, claims, drawings and summary is incorporated herein by reference in its entirety.

What is claimed is:

1. An acceleration sensor device provided with an acceleration sensor which is an electrostatic induction conversion device for conversion between electric energy and kinetic energy, which comprises a conductor and an electret moving relatively to the conductor, said acceleration sensor device having:
   an acceleration detection unit to detect a signal corresponding to acceleration, from an AC voltage output by the acceleration sensor;
   a rectification unit to rectify the AC voltage; and
   a power supply circuit having a battery to drive circuits in the device and adapted to charge the battery with the rectified voltage as electric energy,
   wherein the acceleration sensor device further has:
   an abnormal vibration-detecting circuit which compares the rectified voltage with a preset threshold voltage to output an abnormal signal notifying an abnormality when the rectified voltage exceeds the threshold voltage,
   a recording circuit which is activated by the abnormal signal output by the abnormal vibration-detecting circuit as triggered by an abnormal vibration detected by the acceleration detection unit, to start recording a signal corresponding to acceleration; and which terminates the recording at a preset timing, and
   a determination unit to determine whether the abnormal vibration is a vibration which should be recorded, by comparing an objective vibration pattern consisting of the frequency of the signal corresponding to acceleration and the spectrum intensity corresponding to the frequency, with a preset reference vibration pattern consisting of a frequency and its corresponding spectrum intensity to determine by the comparative result whether the signal corresponding to acceleration should be recorded.

2. The acceleration sensor device according to claim 1, wherein the recording circuit which is activated by the abnormal signal output by the abnormal vibration-detecting circuit as triggered by an abnormal vibration detected by the acceleration detection unit, to start recording a signal corresponding to acceleration, stops recording the signal corresponding to acceleration, by an abnormal vibration-end signal output by the abnormal vibration-detecting circuit which detects the end of the abnormal vibration.

3. The acceleration sensor device according to claim 1, wherein the determination unit holds a setting range with an upper limit and a lower limit of a spectrum intensity for each frequency, which is determined by each frequency of the reference vibration pattern and the spectrum intensity of the frequency, and it determines whether the signal corresponding to acceleration should be recorded, by the comparative result of whether the spectrum intensity of each frequency of the objective vibration pattern is within the setting range.

4. The acceleration sensor device according to claim 1, wherein the determination unit carries out Fourier transform to obtain a frequency of the vibration corresponding to acceleration and a spectrum intensity corresponding to the frequency at every predetermined time interval.

5. The acceleration sensor device according to claim 4, wherein the detection unit internally memorizes the voltage of the vibration corresponding to acceleration from the beginning to the end of an abnormal signal, and, at every predetermined time interval, the determination unit sequentially reads out the voltage of the vibration corresponding to acceleration for each time range corresponding to the predetermined time interval and carries out Fourier transform to generate an objective vibration pattern.

6. The acceleration sensor device according to claim 1, wherein the predetermined setting range in the determination unit is generated from a reference vibration pattern attributed to a disturbance vibration in an environment, which is obtained in a predetermined period of time.

7. The acceleration sensor device according to claim 1, wherein a material for the electret in the acceleration sensor comprises an organic material.

8. The acceleration sensor device according to claim 1, wherein a material for the electret in the acceleration sensor contains at least one cycloolefin polymer.

9. The acceleration sensor device according to claim 1, wherein a material for the electret in the acceleration sensor comprises a fluoropolymer.

10. The acceleration sensor device according to claim 1, wherein a material for the electret in the acceleration sensor comprises a polymer having a fluoroalicyclic structure in its main chain.

11. The acceleration sensor device according to claim 1, wherein the recording circuit further has a numerical value-detecting acceleration sensor to detect a numerical value of the acceleration, wherein the numerical value-detecting acceleration sensor is able to detect numerical values that are output by one or more acceleration sensors.

12. The acceleration sensor device according to claim 11, wherein the numerical value-detecting acceleration sensor is more precise than the acceleration sensor.

13. A wireless sensor network having plural sensor nodes and a data collection server which collects data detected by the sensor nodes, wherein at least one sensor node is the acceleration sensor device as defined in claim 1 having a built-in wireless communication function.

14. A wide area-abnormal vibration recording system which uses the wireless sensor network as defined in claim 13.

* * * * *